United States Patent [19]
Tomita et al.

[11] Patent Number: 5,717,960
[45] Date of Patent: Feb. 10, 1998

[54] IMAGE VIBRATION CORRECTING DEVICE

[75] Inventors: Hiroyuki Tomita; Kazutoshi Usui; Tadao Kai, all of Kawasaki, Japan

[73] Assignee: Nikon Corporation, Tokyo, Japan

[21] Appl. No.: 707,471

[22] Filed: Sep. 5, 1996

[30] Foreign Application Priority Data

| Sep. 6, 1995 | [JP] | Japan | 7-228870 |
| Sep. 7, 1995 | [JP] | Japan | 7-229768 |
| Sep. 14, 1995 | [JP] | Japan | 7-262583 |

[51] Int. Cl.⁶ ............................. G03B 17/00
[52] U.S. Cl. ............................. 396/55; 396/52
[58] Field of Search .............. 396/52, 54, 55, 396/13

[56] References Cited

U.S. PATENT DOCUMENTS

| 4,290,684 | 9/1981 | Hines | 396/13 |
| 4,780,739 | 10/1988 | Kawakami et al. | 396/54 |
| 5,084,724 | 1/1992 | Maeno | 396/55 |
| 5,266,988 | 11/1993 | Washisu | 354/70 |

FOREIGN PATENT DOCUMENTS

| 2-66536 | 3/1990 | Japan . |
| 4-76525 | 3/1992 | Japan . |

Primary Examiner—Russell E. Adams

[57] ABSTRACT

An image vibration correcting device has a vibration correcting optical system so movable as to vary an optical axis of a phototaking optical system in order to correct an image vibration resulting from vibration, a drive force generating unit including a magnetic member and a coil, for generating an electromagnetic force for driving the vibration correcting optical system, a substrate bearing a pattern for transmitting an electrical signal, and a support member composed of a conductive elastic material, supporting the vibration correcting optical system and electrically connecting the pattern on the substrate with the coil in the drive force generating unit.

26 Claims, 22 Drawing Sheets

CORRECTION OPTICAL
SYSTEM DRIVING
DIRECTION

CORRECTION OPTICAL
SYSTEM DRIVING
DIRECTION

IMAGE VIBRATION CORRECTING DEVICE

BACKGROUND OF THE INVENTION

1. Field of the Invention

The present invention relates to an image vibration correcting device for correcting image blur resulting from hand vibration in a camera or the like.

2. Related Background Art

Conventionally there is known a vibration correcting device which, in order to prevent vibration of the image resulting from vibration of the camera at the phototaking operation, moves a lens (vibration correcting lens) constituting a part of the phototaking lens in a direction perpendicular to the optical axis. For supporting a lens chamber, there is known an elastic supporting method as disclosed in the Japanese Patent Application Laid-Open No. 2-66536. Also for driving such a correcting lens, there is known an electromagnetic driving method as disclosed in the Japanese Patent Application Laid-Open No. 3-186823.

FIG. 1 is a cross-sectional view showing a supporting device for a lens chamber in a conventional image vibration correcting device. A vibration correcting optical system 1 is supported by a lens chamber 2, which is connected to and supported by end portions of supporting rods 3, composed of elastic members. The other ends of the supporting rods 3 are fixed by a fixing member 4.

In the vicinity of the lens chamber 2, there is provided an electromagnetic actuator (not shown), for driving the lens chamber 2 and the vibration correcting optical system 1. A current supply in a coil of the electromagnetic actuator generates an electromagnetic force therein, thereby driving the lens chamber 2.

However such a conventional image vibration correcting device has been associated with the following drawbacks.

Firstly, for the current supply to the coil of the electromagnetic actuator, a PVC insulated wire (a vinyl covered cord) or a flexible printed circuit substrate (FPC) has to be connected to the terminal of the coil, and such multiple components required for wiring results in a complicated structure. Also the assembling operation becomes difficult and the rate of failure increases because of the large number of the components.

Secondly, in the structure shown in FIG. 1, the effective length L of the supporting rods 3 cannot be made large. FIGS. 2A and 2B show a state in which the supporting rod 3 is bent by the driving of the vibration correcting optical system 1. The supporting rod 3 has an effective length L when it is not bent as shown in FIG. 2A, wherein the supporting rod 3 is connected to the lens chamber 2 at a point A.

On the other hand, when the vibration correcting optical system 1 is displaced by x in a direction substantially perpendicular to the optical axis as shown in FIG. 2B, whereby the connecting point A between the supporting rod 3 and the lens chamber 2 is displaced to a point A', the vibration correcting optical system 1 is displaced not only in the direction perpendicular to the optical axis by x but also in the axial direction by an amount z. Such axial displacement of the vibration correcting optical system 1 significantly deteriorates the optical performance. Such deterioration in the optical performance can be prevented by limiting the amount of displacement of the vibration correcting optical system 1, but a large vibration becomes uncorrectable because of such limitation of displacement.

FIG. 3 is a chart showing the axial displacement z in the ordinate as a function of the drive amount x of the vibration correcting optical system 1 in the abscissa, for six supporting rods LA to LF of different lengths in the decreasing order. A relationship of length of the supporting rod 3 assumes as follows: LA>LB>LC>LD>LE>LF. For a same drive amount x of the vibration correcting optical system 1, the axial displacement z thereof becomes larger as the supporting rod 3 becomes shorter. Consequently, in the conventional structure in which the length of the supporting rod 3 is difficult to increase, the axial displacement z of the vibration correcting optical system 1 becomes inevitably large at the displacement thereof.

FIG. 4 is a cross-sectional view showing a drive device for the vibration correcting optical system in a conventional image vibration correcting device, wherein the vibration correcting optical system 1 is supported by a lens chamber 2. In the vicinity of the lens chamber 2 there is provided an electromagnetic actuator 5, for driving the lens chamber 2 or the vibration correcting optical system 1 therein. The electromagnetic actuator 5 is composed of a magnet 6, a yoke 7, and a coil 8. A current supply in the coil 8 generates an electromagnetic force, thereby driving the lens chamber 2.

The image vibration correcting device is provided with a position detecting device 9, composed of a slit 10a of a slit member 10, a light emitting element (IRED) 11 and a photosensor element (PSD) 12, for detecting the position of the vibration correcting optical system 1. The slit member 10 is integrally provided with the lens chamber 2 and is provided, in a part thereof, with a slit or an aperture 10a through which the light can pass, and the light-emitting element 11 and the photosensor element 12 are provided in a mutually opposed manner, across the slit member 10. The slit emitting element 11 is mounted on a fixed member 4, and the light emitted from the light emitting element 11 is transmitted by the slit 10a and received by the photosensor element 12 whereby the movement of the vibration correcting optical system 1 is converted into the movement of the light falling on the photosensor element 12.

However, in such a conventional image vibration correcting device, a PVC insulated wire or a flexible printed circuit substrate (FPC) has to be connected to the light-emitting element 11 for supplying current for the light-emitting element 11, and such multiple components required for wiring results in a complicated structure. Also the assembly operation becomes difficult and the rate of failure increases because of the large number of the components.

Also there is encountered the following drawback.

FIGS. 5A and 5B show the light transmission in the position detecting device 9. The photosensor element 12 releases a current according to the position, on the light-receiving surface, of the center of gravity of the light 11a transmitted by the slit, and detects the position of the vibration correcting optical system 1 by processing such output current. In FIG. 5A, D1 indicates the distance between the light-emitting element 11 and the photosensor element 12, and D2 indicates the distance between the slit member 10 and the photosensor element 12.

When the slit 10a is vertically beneath the light-emitting element 11, namely when the vibration correcting optical system 1 is at the center of the central position of the driving stroke, the positional output of the photosensor element 12 coincides with the central position of the slit 10a (FIG. 5A). However, when the vibration correcting optical system 1 is moved and the slit 10a is no longer vertically beneath the light-emitting element 11, the position of the slit 10a and the positional output of the photosensor element 12 no longer mutually coincide but involve an error δx1 (FIG. 5B). This error can be represented as:

$$\delta x1 = D2 \cdot x/(D1-D2) \tag{1}$$

so that δx1 increases proportionally with the moving amount x of the slit 10a.

FIG. 6 is a chart showing the positional output of the photosensor element 12 as a function of the moving amount x of the slit 10a in the position detecting device 9, wherein the central drive position of the vibration correcting optical system 1 is taken at the origin, and broken lines indicate the movement of the center of the slit 10a. In FIG. 6, within a range indicated as the effective stroke, the positional output of the photosensor element 12 is proportional to the drive amount of the slit 10a, so that precise detection of the position can be achieved within this range. However, the light from the light-emitting element 11 is eclipsed by the thickness of the slit member 10 when the drive amount x of the slit 10a increases, and the light 11a coming from the slit no longer falls on the photosensor element 12 when the drive amount x becomes even larger, so that the positional output of the photosensor element 12 becomes no longer proportional to the drive amount x of the slit 10a. In FIG. 6, the graph shows distortion in a region for a larger value of x.

In the image vibration correcting device of the foregoing conventional example, D1 cannot be made large because of the structural limitation. For this reason, the light 11a from the slit falls out of the photosensor element 12 while the moving amount x of the slit 10a is not too large. Also a small D1 value increases the influence of light eclipse (vignetting) by the thickness of the slit member 10. Consequently, for a small value of D1, the effective stroke is limited to a narrow range in the vicinity of the center of drive of the vibration correcting optical system 1.

Therefore, when the drive amount of the vibration correcting optical system 1 is large, the position thereof cannot be detected precisely so that the precision of the control cannot be improved. On the other hand, when the drive amount of the vibration correcting optical system 1 is small, the range of correction becomes limited so that the effect of image vibration correction is limited.

Furthermore, though the electromagnetic actuator 5 has been proposed as the driving device for the vibration correcting optical system 1, the method of fixing the coil 8 thereof has not been given particular consideration. The coil 8 is usually fixed by adhesion to a support unit therefor, but such method not only increases the number of assembly steps but also requires the handling of the leads wires of the coil 8 after the adhesion. As the coil 8 is composed of a wire as thin as about 0.1 mm $\phi$, the lead wire can be easily cut during the assembly operation or by contact with the fixed member 4 when the coil is driven.

Furthermore, for supporting the lens chamber 2 of the vibration correcting optical system 1, the aforementioned Japanese Patent Application Laid-Open No. 2-66536 proposes a supporting method with an elastic supporting member, but the details of fixing method for such supporting member are not given except for the description of fixing by soldering.

SUMMARY OF THE INVENTION

An object of the present invention is to simplify electrical connection in the image vibration correcting device, thereby simplifying the structure thereof. Another object of the present invention is to provide a structure of the vibration correcting optical system with an extended length of the supporting members therefor, thereby enabling highly precise correction of image vibration.

The above-mentioned objects can be attained, according to the present invention, by an image vibration correcting device comprising a vibration correcting optical system which is so movable as to vary the optical axis of a phototaking optical system for correcting image blur resulting from a vibration, a drive force generating unit for generating an electromagnetic force by means of a magnetic member and a coil for driving the above-mentioned vibration correcting optical system, a substrate bearing patterns for transmitting electrical signals, and support members composed of an electroconductive elastic material, supporting the vibration correcting optical system and so mounted as to electrically connect the patterns on the substrate and the coil of the drive force generating unit.

The vibration correcting device of the present invention is preferably provided with a mounting plate, disposed between the substrate and the vibration correcting optical system, for mounting the magnetic member of the drive force generating unit.

Preferably the support members are fixed on the substrate, and the mounting plate is so formed as to be free of contact with the support members.

Also, the substrate and the mounting plate are preferably formed integrally by a fixing portion.

The substrate is preferably coupled with screws to the mounting plate, in the vicinity of coupling with the support members.

The number of the fixing portions is preferably at least equal to that of the support members.

Also the rigidity of the mounting plate is preferably at least equal to that of the substrate.

The substrate is preferably so formed as not to intercept the optical axis.

Another object of the present invention is to provide a structure with an extended distance between the light-emitting element and the photosensor element, thereby enabling highly precise correction of the image vibration.

This object can be attained, according to the present invention, by an image vibration correcting device comprising a vibration correcting optical system which is so movable as to vary the optical axis of a phototaking optical system for correcting image blur resulting from a vibration, a substrate bearing patterns for transmitting electrical signals, and a position detecting unit for detecting the position of the vibration correcting optical system, wherein at least a part of the components of the position detecting unit is provided on the substrate and electrically connected with the patterns on the substrate.

Preferably the position detecting unit is adapted to optically detect the position of the vibration correcting optical system by using a light-emitting element and a photosensor element, of which either one is provided on the substrate and is electrically connected with the patterns thereof.

Also, the image vibration correcting device of the present invention is preferably provided with a drive force generating unit for generating an electromagnetic force by means of a magnetic member and a coil, for driving the vibration correcting optical system, and support members composed of an electroconductive elastic material, supporting the vibration correcting optical system and so mounted as to electrically connect the patterns on the substrate and the coil of the drive force generating unit.

Also, the vibration correcting device of the present invention is preferably provided with a mounting plate, positioned between the substrate and the vibration correcting optical system, for mounting the magnetic member of the drive force generating unit, wherein the substrate is fixed on the mounting plate, and wherein the components of the drive force generating unit, mounted on the substrate, are provided in an aperture formed in the mounting plate.

Also, the substrate is preferably provided thereon with a driver circuit for the drive force generating unit.

Still another object of the present invention is to securely fix the elastic support members, for supporting the vibration correcting optical system, by soldering, and to reduce the number of assembly steps required for dealing with the terminals of the coil for driving the vibration correcting optical system.

This object can be attained, according to the present invention, by an image vibration correcting device comprising a vibration correcting optical system so movable as to correct the image vibration, plural elastic support members for supporting the vibration correcting optical system movably in a plane perpendicular to the optical axis of the phototaking device, and an electric circuit substrate fixedly supporting the elastic support members, wherein the electric circuit substrate is provided with throughholes for fixing the elastic support members.

According to the present invention, there is also provided an image vibration correcting device comprising a vibration correcting optical system, an electromagnetic drive device for driving the vibration correcting optical system, a coil constituting the electromagnetic drive device, and a coil support member supporting the coil, wherein the coil is formed integrally with the coil support member.

DESCRIPTION OF THE PREFERRED EMBODIMENTS

Figure 7:
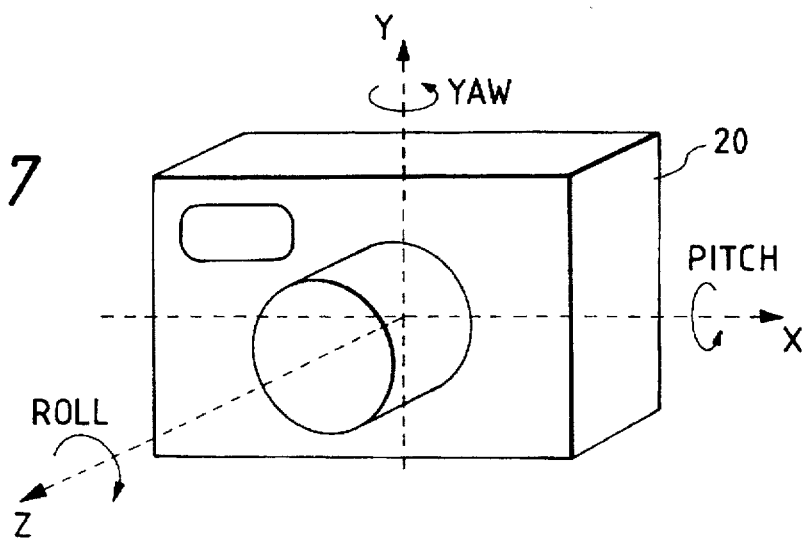
FIG. 7 is a schematic view showing the concept of vibrations in a camera.

FIG. 7 shows the concept of the camera vibration. The vibration of a camera 20 has 6 freedoms and can be divided into pitching, yawing and rolling which are rotating motions in 3 degrees of freedoms, and motions in the X, Y and Z directions which are parallel translations of 3 freedoms. Among these, the translational motion in the Z-direction is dealt with by the AF (auto focusing) mechanism and need not be corrected by the image vibration correcting device. Also the rolling motion, having the center of rotation inside the camera and only inducing limited image deterioration, is not subjected to correction in the present embodiment. Also the translational motions in the X- and Y-directions, only becoming a problem under a high photographing magnification, are not subjected to correction in the present embodiment.

The vibrating motions of the camera are monitored by an angular velocity sensor, composed of piezoelectric vibration sensors for detecting the Coriolis' force. There are employed two angular velocity sensors, for respectively detecting the pitching and the yawing. The angular velocity sensor may be replaced by an angular acceleration sensor, but, in order to convert the angular acceleration signal into angular information, the output signals has to be integrated twice. Since the integration constants at such integrating operations are difficult determine in a precise manner, it is practically difficult to use an angular acceleration sensor as the vibration sensor. Also, though it is desirable to use an angular sensor instead of the angular velocity sensor, there is not available a precise angular sensor that can be mounted on the camera.

The present embodiment detects the pitching and yawing vibrations from the outputs of the angular velocity sensors and suppresses the image vibration by driving an internal optical system in a plane perpendicular to the optical axis, so as to cancel the image vibration.

Figure 8:
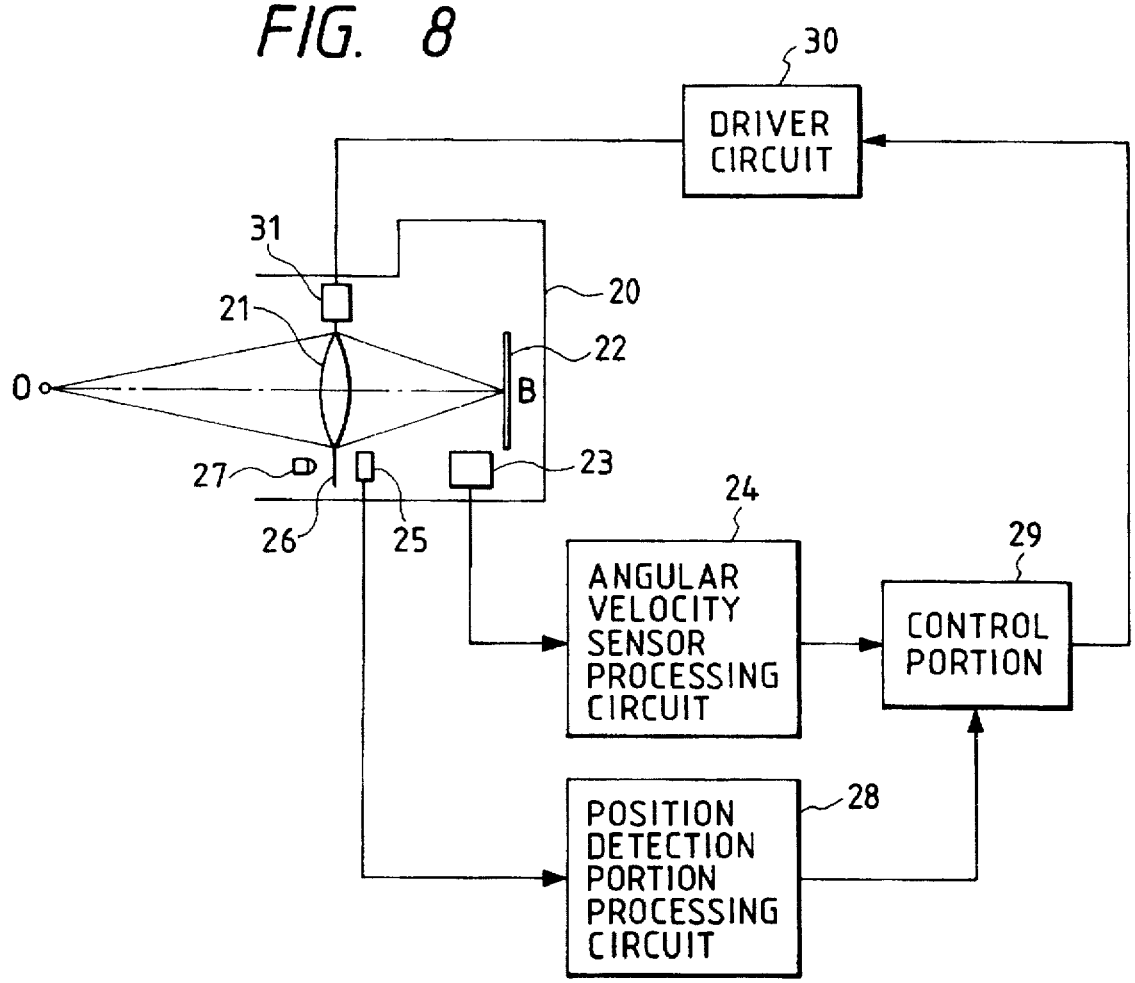
FIG. 8 is a block diagram of an image vibration correcting device, in a state where the camera is free from pitching.
Figure 9:
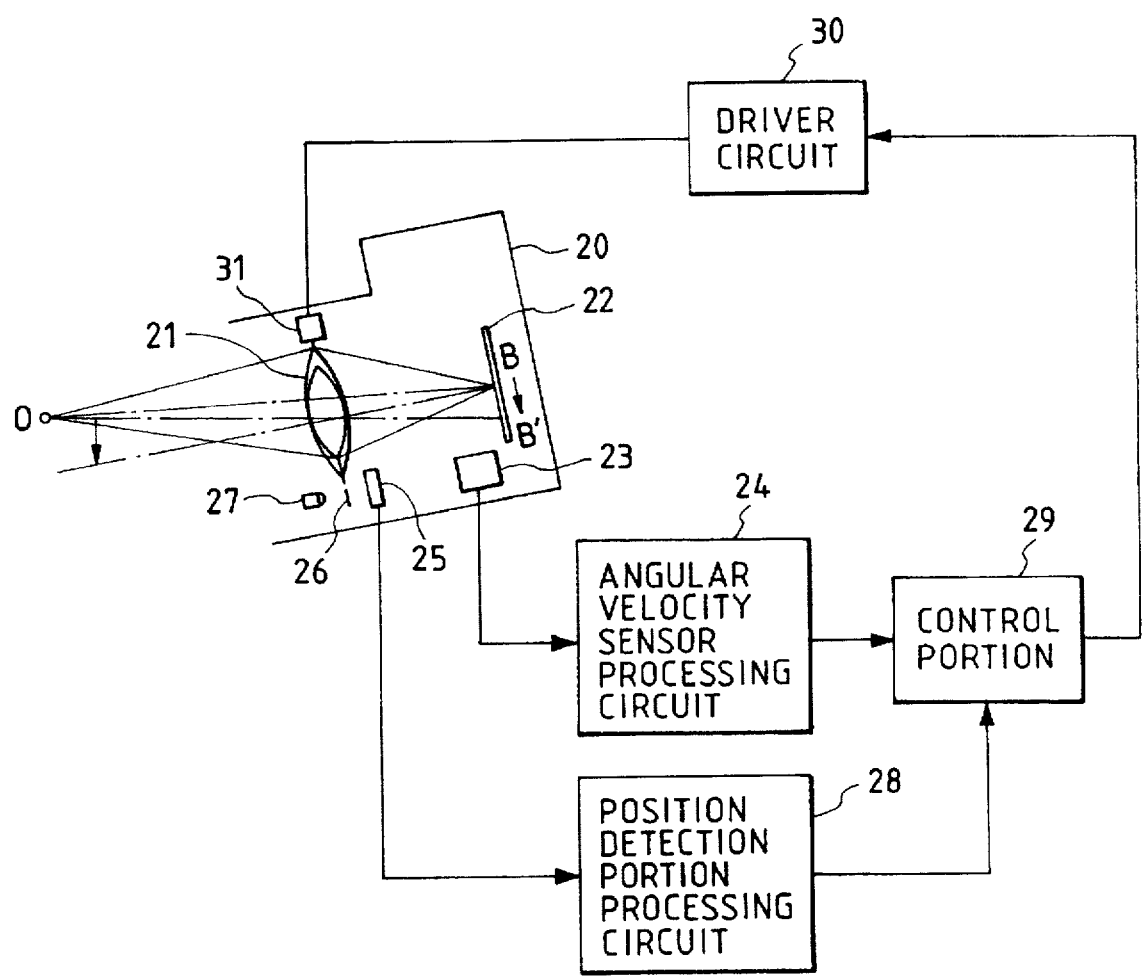
FIG. 9 is a block diagram of an image vibration correcting device, in a state where the camera shows pitching.

FIGS. 8 and 9 show the image vibration correcting method in case the camera effects a pitching vibration. FIG. 8 is a schematic cross-sectional view in a state where the camera has no pitching vibration, wherein a camera body is indicated by 20. An object O forms an image in a position B on a film plane 22, through a vibration correcting lens or a vibration correcting optical system 21. FIG. 9 is a schematic cross-sectional view in a state where the camera effects pitching vibration. Because of the pitching motion of the camera body 20, the image formed in the position B on the film plane 22 moves to a position B', corresponding to the image vibration or blur on the film plane. Such vibration can be corrected by driving the vibration correcting optical system 21 in a direction perpendicular to the optical axis, based on the following mechanism.

When the camera 20 effects a pitching motion, the pitching angular velocity of the camera 20 is monitored by a pitching angular velocity sensor 23. The output signal of the angular velocity sensor 23 is supplied to an angular velocity sensor process circuit 24 and is converted therein into a target drive position signal for the vibration correcting optical system 21. On the other hand, the position of the vibration correcting optical system 21 is monitored by a position detecting element 25. There are provided a slit member 26 having a slit, and a light-emitting element 27. A position signal monitored by the position detecting element 25 is supplied, through a position detection process circuit 28, to a control unit 29, which sends a control signal to a driver circuit 30, based on the target drive position signal for the vibration correcting optical system obtained from the angular velocity sensor 23 and the position detecting element 25 and a current position signal indicating the current position of the vibration correcting optical system 21, so as to reduce the difference of these two signals. In response to the control signal, the driver circuit 30 drives an actuator 31 for driving the vibration correcting optical system 21. Such driving of the vibration correcting optical system 21 allows a constant image position, to be maintained despite the pitching motion of the camera 20.

Figure 10:
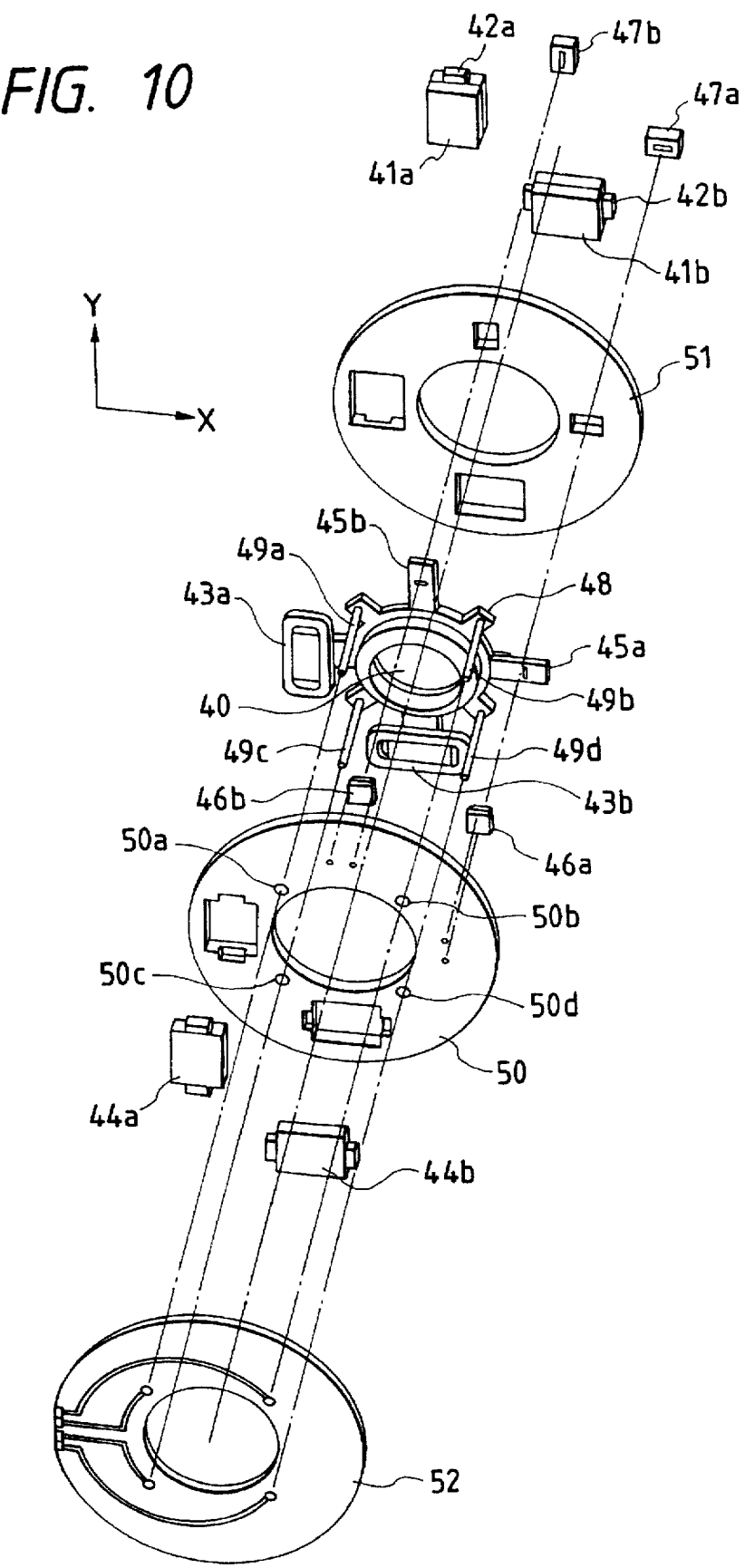
FIG. 10 is an exploded perspective view of a first embodiment of the image vibration correcting device of the present invention.

In the following there will be explained an embodiment of the present invention, with reference to the attached drawings. FIG. 10 is an exploded perspective view of a first embodiment of the image vibration correcting device of the present invention.

Referring to FIG. 10, the image vibration correcting device is composed of a vibration correcting optical system 40, a drive force generating unit (41a, 41b, 42a, 42b, 43a, 43b, 44a, 44b), and a position detecting unit (45a, 45b, 46a, 46b, 47a, 47b).

The vibration correcting optical system 40 is a lens group adapted to move in a direction substantially perpendicular to the optical axis, thereby correcting the image vibration at the phototaking operation. The vibration correcting optical system 40 is supported by a lens chamber 48, which is provided with four supporting rods 49a, 49b, 49c, 49d surrounding the external periphery of the vibration correcting optical system 40 at an interval of about 90°. The supporting rods 49a to 49d are composed of an elastic material of a high electro-conductivity.

The drive force generating unit electromagnetically generates a driving force for driving the vibration correcting optical system 40, and is composed of yokes 42a, 42b, 44a, 44b, magnets 41a, 41b and coils 43a, 43b. These components are divided into the yokes 42a, 44a, magnet 41a and coil 43a for driving the vibration correcting optical system 40 in the X-direction and the yokes 42b, 44b magnet 41b and coil 43b for driving the vibration correcting optical system 40 in the Y-direction.

Figure 11:
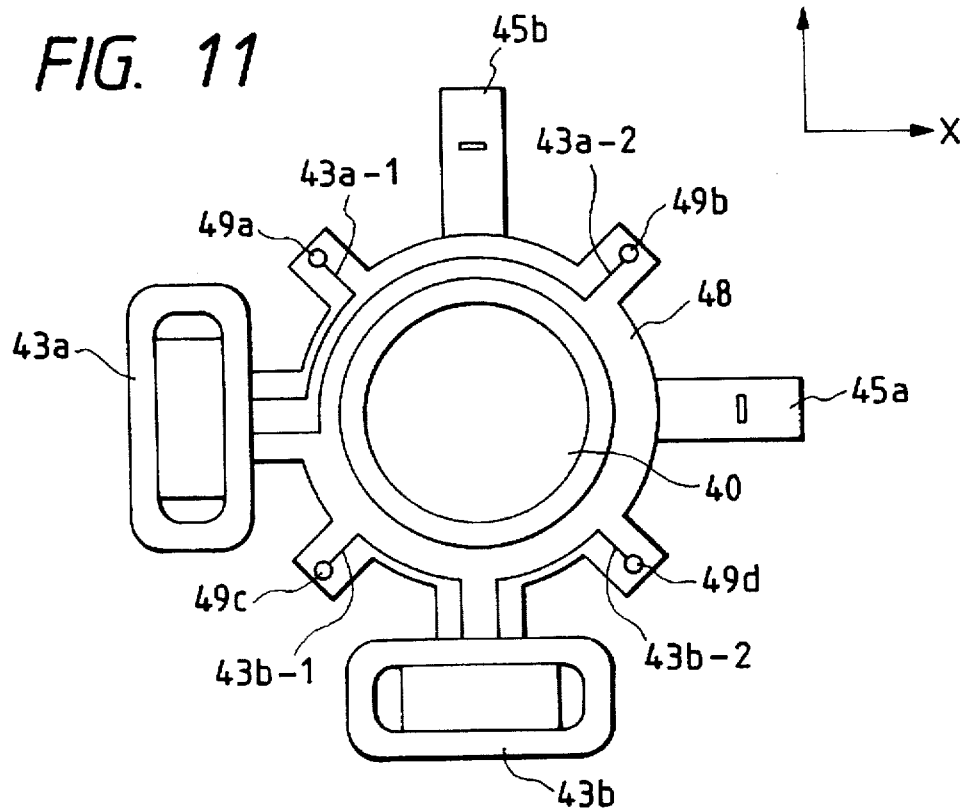
FIG. 11 is a detailed plan view of a vibration correcting optical system 40 and a lens chamber.

FIG. 11 is a detailed plan view of the vibration correcting optical system 40 and the lens chamber 48. Referring to FIG. 11, the coils 43a, 43b are mounted on the lens chamber 48, with a mutual interval of approximately 90° (therebetween in approximately mutually perpendicular directions). The lens chamber 48 is provided with lead wire portions 43a-1, 43a-2 electrically connected with the coil 43a, and lead wire portions 43b-1, 43b-2 electrically connected with the coil 43b, and these lead wire portions are electrically connected respectively with the supporting rods 49a, 49b, 49c, 49d.

Referring to FIG. 10, a top plate 50 and a bottom plate 51 are provided on both axial sides, of the vibration correcting optical system 40. The yokes 44a, 44b are mounted on the top plate 50, while the magnets 41a, 41b and the yokes 42a, 42b are mounted on the bottom plate 51, in such a manner that the magnets 41a, 41b and the yokes 42a, 42b, 44a, 44b are positioned in a mutually opposed manner with appropriate distances to the coils 43a, 43b.

Figure 12:
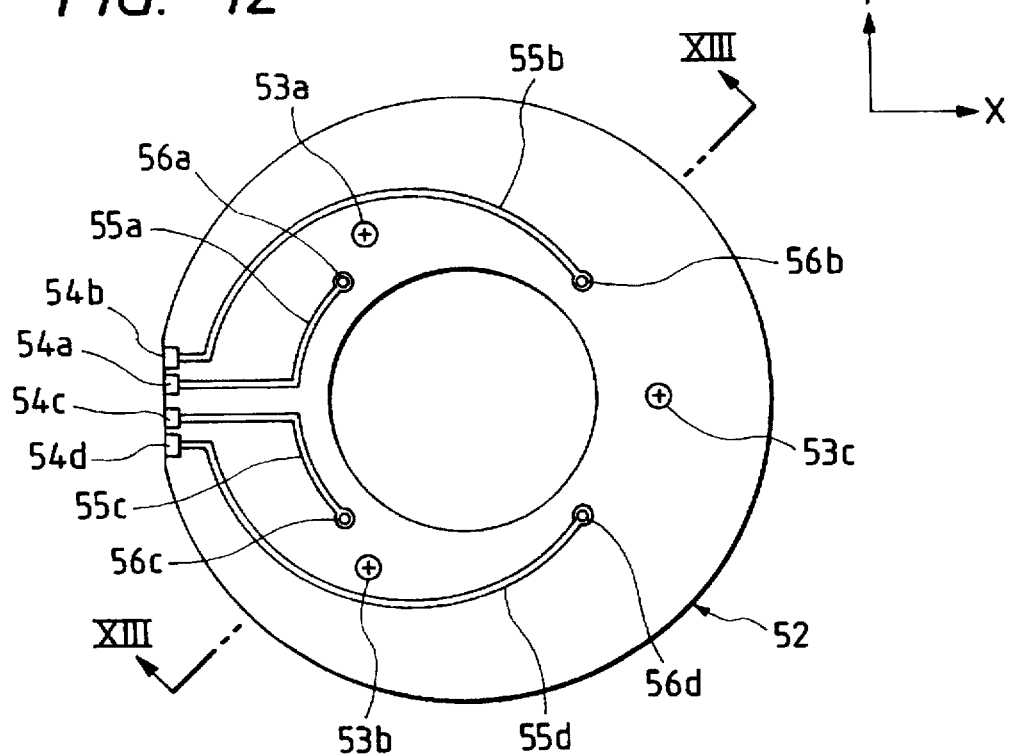
FIG. 12 is a detailed plan view of a substrate.

Outside the top plate 50 (opposite to the vibration correcting optical system 40) there is provided a substrate 52 which is shown in a detailed plan view in FIG. 12 and which is coupled with the top plate 50 by screws 53a, 53b, 53c.

The substrate 52 is provided at an end thereof with conductive terminals 54a, 54b, 54c, 54d, and further bears patterns 55a, 55b, 55c, 55d for transmitting electrical signals, which are electrically connected with the conductive terminals 54a to 54d and which are provided, at the ends thereof, with holes 56a, 56b, 56c, 56d. In these holes 56a to 56d the supporting rods 49a to 49d are inserted and fixed by soldering, thereby being electrically connected to the patterns 55a to 55d. Consequently the electrical signals supplied to the conductive terminals 54a to 54d are transmitted to the coils 43a, 43b through the patterns 55a to 55d of the substrate 52, the supporting rods 49a to 49d and lead wire portions 43a-1, 43a-2, 43b-1, 43b-2.

The above-explained configuration allows transmission of the electrical signals to the coils 43a, 43b while reducing the number of components and wiring members, thereby simplifying the structure and the assembly process.

Again referring to FIG. 10, the position detecting unit is composed of light-emitting elements (IRED) 46a, 46b; photosensor elements (PSD) 47a, 47b and slit members 45a, 45b.

The slit members 45a, 45b are provided with apertures or slits for transmitting the light emitted from the light-emitting elements 46a, 46b, and are integrally formed, with a mutual distance of approximately 90° about the optical axis, with the lens chamber 48 (cf. FIG. 11). The light-emitting elements 46a, 46b are fixed on the top plate 50, while the photosensor elements 47a, 47b are fixed on the bottom plate 51, in such a manner that the light-emitting elements 46a, 46b are opposed to the photosensor elements 47a, 47b across the slit members 45a, 45b.

When an electrical signal is supplied to the conductive terminal 54a, 54b of the substrate 52, it is transmitted to the coil 43a whereby the vibration correcting optical system 40 is driven in the X-direction by an electromagnetic force generated by the yokes 42a, 44a, the magnet 41a and the coil 43a of the drive force generating unit. Similarly, when an electrical signal is supplied to the conductive terminal 54c, 54d of the substrate 52, it is transmitted to the coil 43b whereby the vibration correcting optical system 40 is driven in the Y-direction by an electromagnetic force generated by the yokes 42b, 44b, the magnet 41b and the coil 43b of the drive force generating unit. In this manner the vibration correcting optical system 40 is driven in a direction substantially perpendicular to the optical axis, thereby correcting the image vibration.

The movement of the vibration correcting optical system 40 in the X-direction is detected by the light-emitting element 46a, the slit of the slit member 45a and the photosensor element 47a of the position detecting unit. More specifically, the light emitted from the light-emitting element 46a is transmitted by the slit of the slit member 45a and enters the photosensor element 47a, which detects the position of the center of gravity of the entering light and releases a corresponding current. Similarly, the movement of the vibration correcting optical system 40 in the Y-direction is detected by the light-emitting element 46b, the slit of the slit member 45b and the photosensor element 47b of the position detecting unit.

Figure 1:
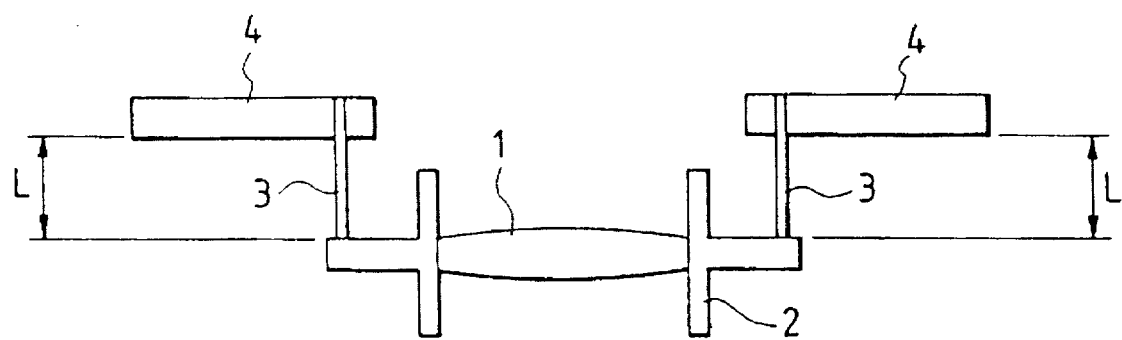
FIG. 1 is a cross-sectional view of a supporting device for a lens chamber in a conventional image vibration correcting device.
Figure 13:
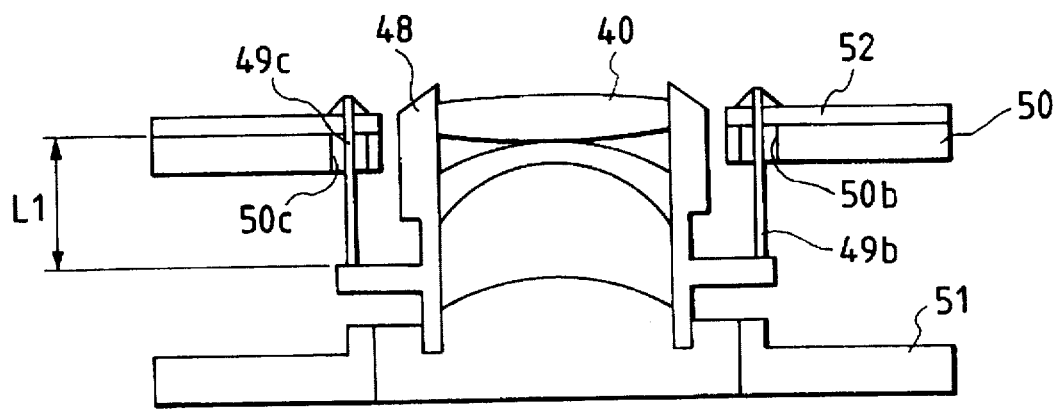
FIG. 13 is a cross-sectional view of the image vibration correcting device taken along a line XIII—XIII in FIG. 12.

FIG. 13 is a cross-sectional view of the image vibration correcting device taken along a line XIII—XIII in FIG. 12, wherein L1 indicates the effective length of the supporting rods 49a, 49b, 49c, 49d. The substrate 52, to which the supporting rods 49a to 49d are fixed, is fixed to a face, opposite to the lens chamber 48, of the top plate 50. The top plate 50 is provided with holes 50a, 50b, 50c, 50d through which the supporting rods 49a to 49d penetrate without contacting the top plate 50. Such a configuration allows the length of the supporting rods 49a to 49d, to be extended in comparison with the conventional structure shown in FIG. 1, thereby reducing the axial displacement of the vibration correcting optical system 40 when it is driven, thus avoiding deterioration in the optical performance and enabling highly precise correction of even a large vibration.

However, if the size of the image vibration correcting device can be so increased as to give a sufficient length to the supporting rods 49a to 49d, the substrate 52 may be fixed on a side of the top plate 50 closer to the lens chamber 48.

Figure 14A:
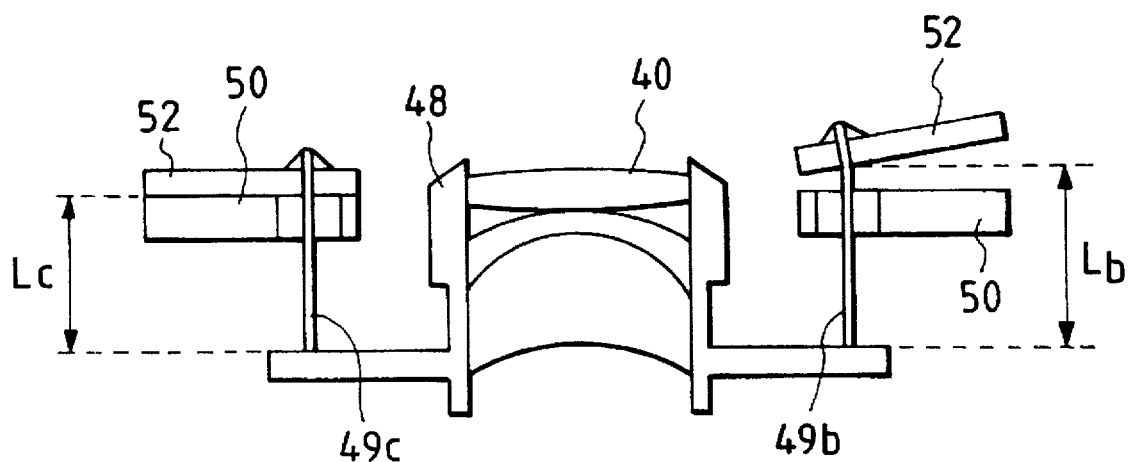
FIGS. 14A and 14B are cross-sectional views of the image vibration correcting device when the substrate is deformed.
Figure 14B:
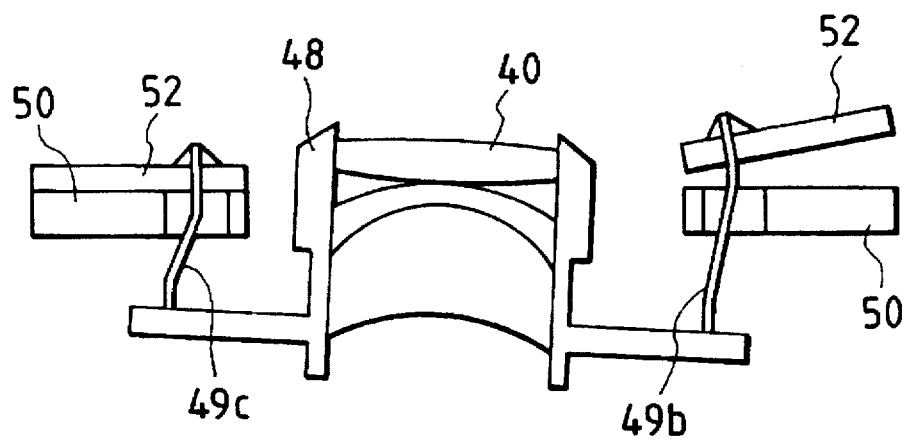

The substrate 52 may however be distorted in some cases, and its rigidity is generally lower than that of metallic materials. FIGS. 14A and 14B are cross-sectional views, similar to that in FIG. 13, showing an image vibration correcting device with a distorted substrate 52.

As the top plate 50 is of a higher rigidity than the substrate 52, the substrate 52 can be maintained in contact with the top plate 50 in the vicinity of the fixing screws 53a, 53b, 53c, but a gap is inevitably generated between the two in a location distant from such fixing screws. FIG. 14A shows an example in which the substrate 52 and the top plate 50 are mutually separated at the fixing point of the supporting rod 49d. In such a case, the effective length Lb of the supporting rod 49b becomes different from that Lc of the supporting rod 49c, with a relation Lb>Lc in the illustrated case.

Figure 3:
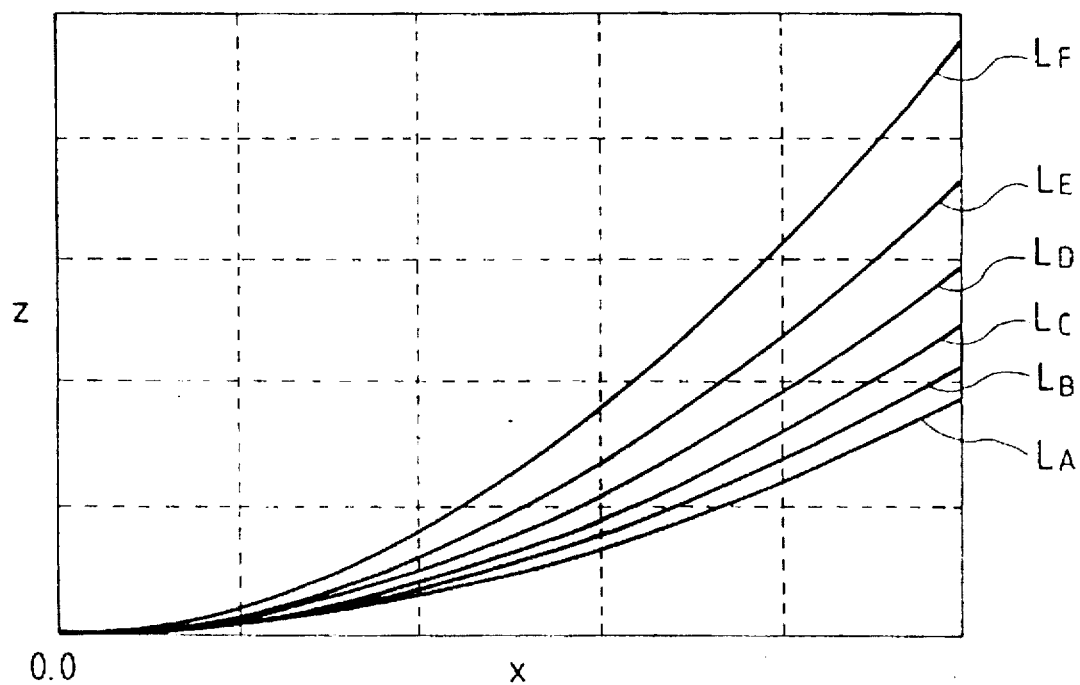
FIG. 3 is a chart showing the axial displacement z of the vibration correcting optical system in the ordinate, as a function of the drive amount x thereof in the abscissa.
Figure 2A:
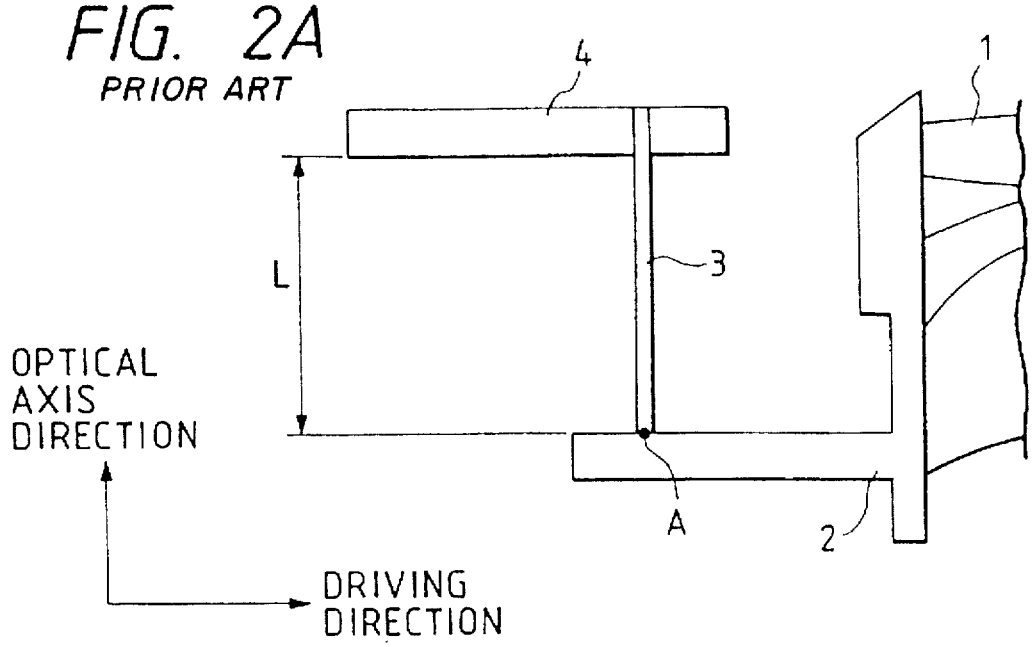
FIGS. 2A and 2B are views showing a state where a vibration correcting optical system 1 is driven and a supporting rod 3 is bent.
Figure 2B:
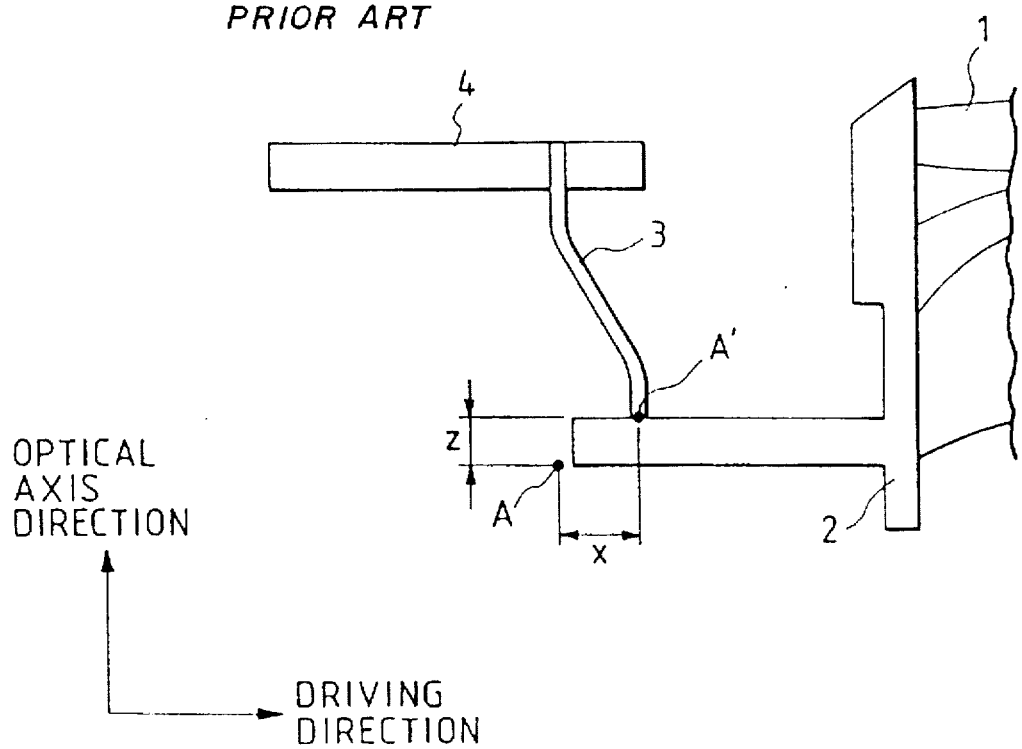

As already explained in FIG. 3, for a given moving amount x of the vibration correcting optical system 40, the axial displacement z thereof becomes larger as the effective length L of the supporting rods 49a to 49d becomes smaller. Consequently, if the supporting rods 49b and 49c have different lengths as shown in FIG. 14A, the axial displacement of the vibration correcting optical system 40 caused by the motion thereof becomes larger at the side of the supporting rod 49c than at the side of the supporting rod 49b. As a result, the vibration correcting optical system 40 becomes inclined by the motion thereof, as shown in FIG. 14B. If the distortion of the substrate 52 is large, such inclination deteriorates the optical performance of the camera. Also such distortion, being different for each substrate 52, may result in a fluctuation in the optical performance, in case of mass production of the image vibration correcting devices.

Figure 15:
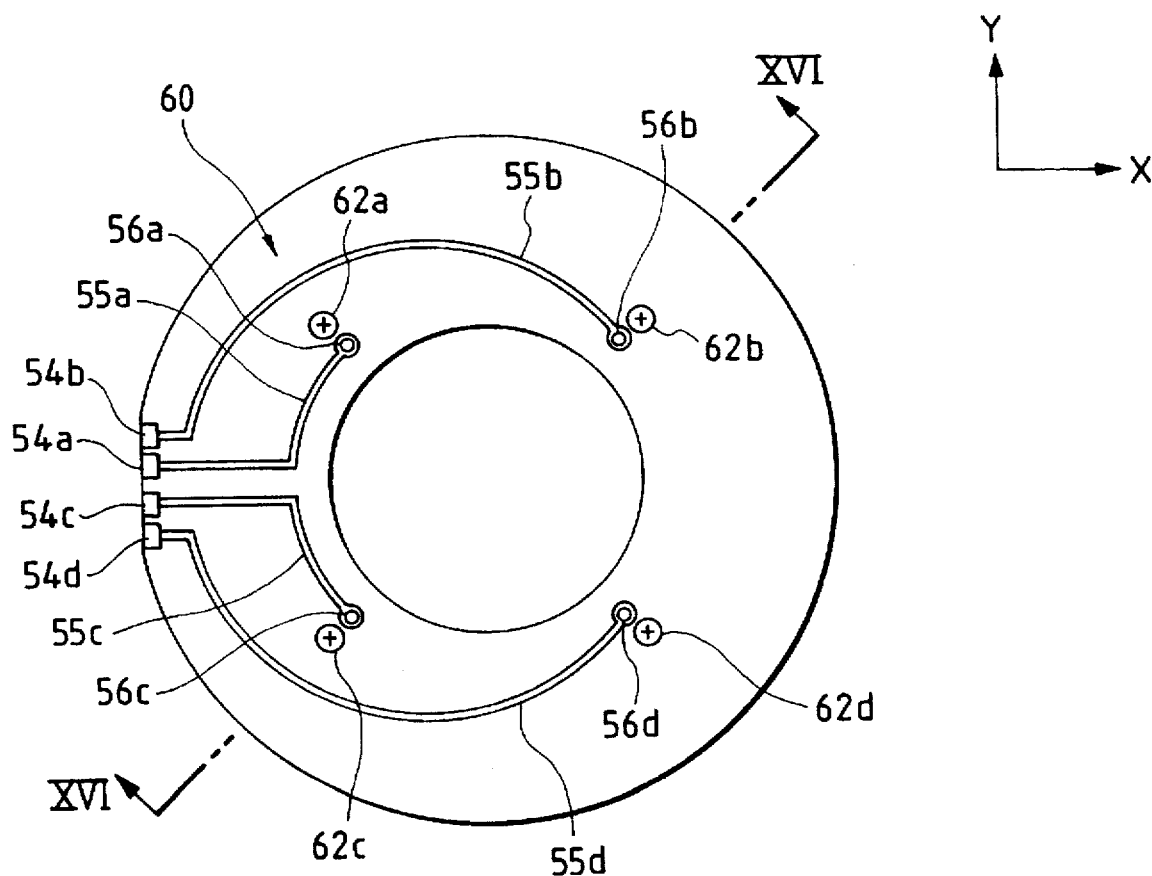
FIG. 15 is a plan view of a substrate in a second embodiment of the image vibration correcting device of the present invention.
Figure 16A:
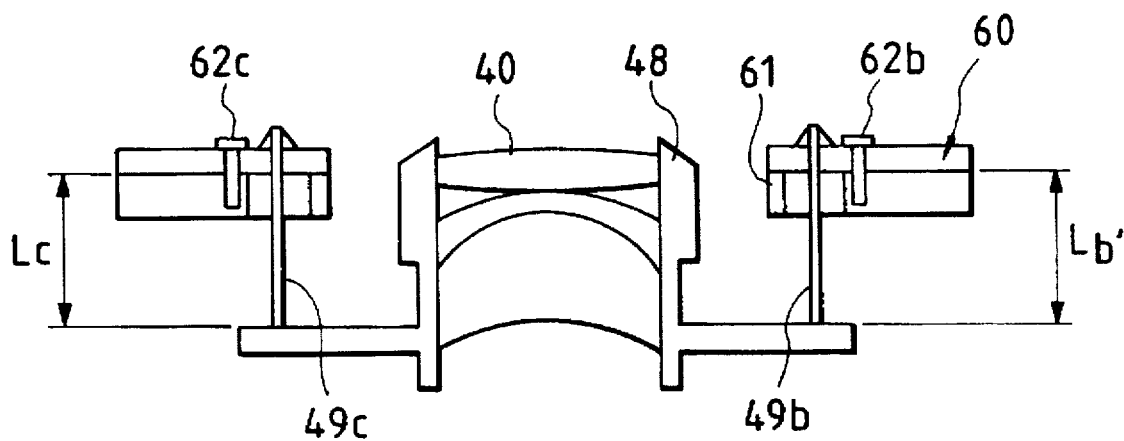
FIGS. 16A and 16B are cross-sectional views of the image vibration correcting device taken along a line XVI—XVI in FIG. 15.
Figure 16B:
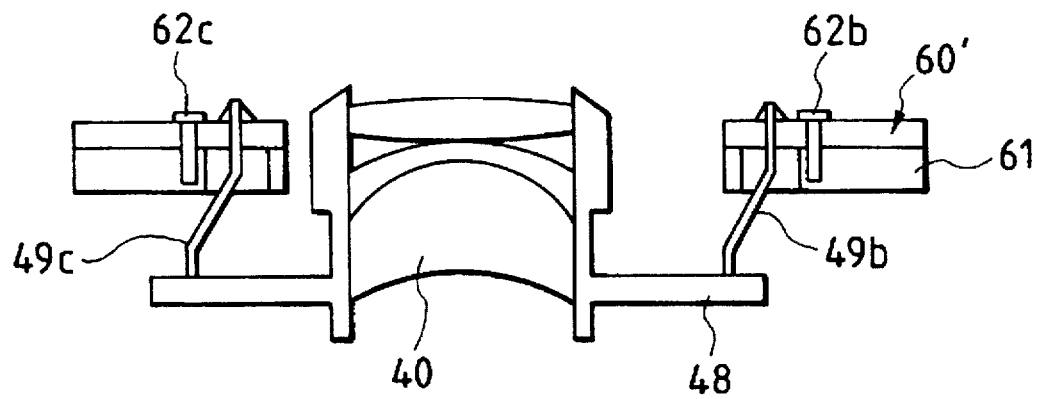

FIG. 15 is a plan view of a substrate 60 in a second embodiment of the image vibration correcting device of the present invention, and FIGS. 16A and 16B are cross-sectional views of the image vibration correcting device taken along a line XVI—XVI in FIG. 15. In these drawings, components equivalent to those in FIGS. 12 and 13 are represented by corresponding numbers.

In the present embodiment, as shown in FIG. 15, the substrate 60 and the top plate 61 are mutually fixed by screws 62a, 62b, 62c, 62d in the vicinity of fixing points of the supporting rods 49a to 49d, so that they are maintained in mutual contact in such fixing points. Thus, as shown in FIG. 16A, the effective lengths Lb', Lc of the supporting rods 49b, 49c become mutually equal. Consequently, when the vibration correcting optical system 40 is moved, it is no longer inclined, as shown in FIG. 16B. Thus the satisfactory optical performance can be maintained, and, also in case of mass production of the image vibration correcting devices, there can be maintained uniform optical performance even if the substrate 60 shows fluctuation in distortion.

The above-mentioned effect can be enhanced if the distance between the fixing position of the supporting rods 49a to 49d and that of the screws 62a to 62d is maintained within three times the diameter of the head of the screws 62a to 62d. Also in the present embodiment, the number Nb of the screws is equal to that Nc of the supporting rods, but the above-mentioned effect can be further enhanced by selecting a condition Nb≧Nc.

Though a condition Nb<Nc as in the first embodiment is also acceptable, a condition Nb≧Nc provides stronger and more precise fixation. Also the fixation of the substrate 60 to the top plate 61 can be achieved, not only by screwing, but also by other methods such as adhesion, caulking or riveting. It is also possible to mount the substrate 60 on a face, closer to the lens chamber 48, of the top plate 61, and to fix the supporting rods 49a to 49d by suitable fixing means provided in the vicinity thereof.

The present invention is not limited to the foregoing embodiments, but is subject to various modifications, within the scope of equivalence, as exemplified in the following:

(1) The substrate 52, 60 needs only to be of a form not intercepting the optical axis, and can for example have a horseshoe form in stead of the doughnut shape shown in the foregoing embodiments;

(2) The patterns 55a to 55d on the substrate 52, 60 are preferably formed on a face thereof coming in contact with the top plate 50, 61 for better assembling property, but they may also be formed on the opposite face; and (3) The image vibration correcting device of the foregoing embodiments are applicable not only to a camera but also to other image taking devices.

As explained in the foregoing, the present invention allows the electrical signals to be transmitted to the coils without employing a large number of wiring components, and with a reduction in the number of components and with simplification in the structure and in the assembling operation.

According to an embodiment of the present invention, it is rendered possible to extend the length of the support members, thereby reducing the axial displacement of the vibration correcting optical system when it is driven, thus avoiding the deterioration in the optical performance and also enabling highly precise correction of even a large vibration.

Also according to an embodiment of the present invention, it is rendered possible to increase the rigidity of the fixing portions of the support members, and to maintain the substrate and the mounting plate in close contact thereby maintaining a uniform length in the plural support members. It is thus made possible to prevent the inclination of the vibration correcting optical system in the driven state thereof and to maintain satisfactory optical performance. Furthermore, in the mass production of the image vibration correcting devices, there can be avoided the fluctuation in the optical performance even if the substrates show fluctuation in distortion.

Also according to an embodiment of the present invention, the substrate can be positioned around the optical axis, without complication in the shape.

Figure 17:
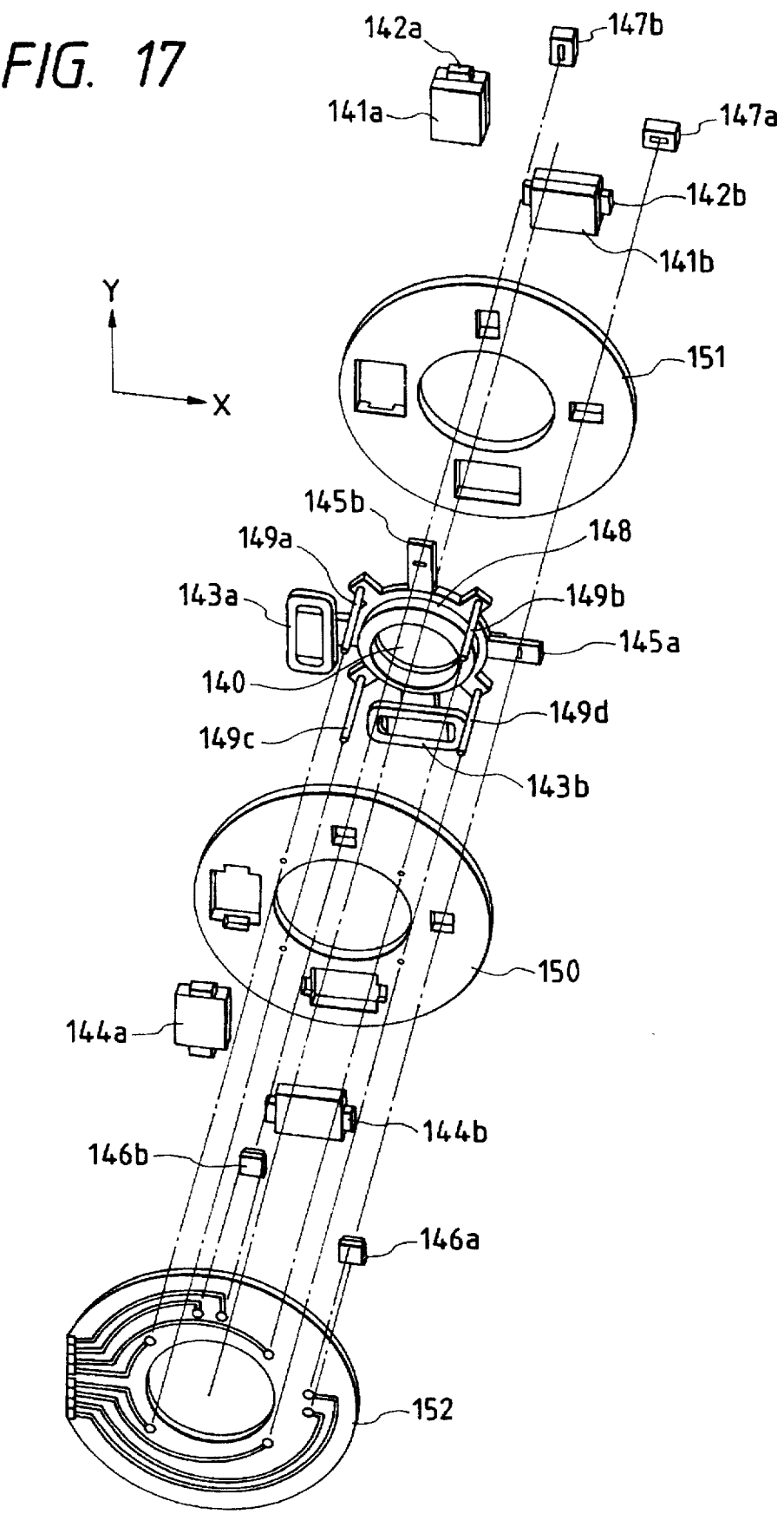
FIG. 17 is an exploded perspective view of a third embodiment of the image vibration correcting device of the present invention.

FIG. 17 is an exploded perspective view of a third embodiment of the image vibration correcting device of the present invention, wherein the image vibration correcting device is composed of a vibration correcting optical system 140, a drive force generating unit (141a, 141b, 142a, 142b, 143a, 143b, 144a, 144b), and a position detecting unit (145a, 145b, 146a, 146b, 147a, 147b).

The vibration correcting optical system 140 is a lens group adapted to move in a direction substantially perpendicular to the optical axis, thereby correcting the image vibration during the phototaking operation. The vibration correcting optical system 140 is supported by a lens chamber 148, which is provided with four supporting rods 149a, 149b, 149c, 149d surrounding the external periphery of the vibration correcting optical system 140 at an interval of about 90°. The supporting rods 149a to 149d are composed of an elastic material of a high electroconductivity.

The drive force generating unit electromagnetically generates a driving force for driving the vibration correcting optical system 140, and is composed of yokes 142a, 142b, 144a, 144b, magnets 141a, 141b and coils 143a, 143b. These components are divided into the yokes 142a, 144a, magnet 141a and coil 143a for driving the vibration correcting optical system 140 in the X-direction and the yokes 142b, 144b, magnet 141b and coil 143b for driving the vibration correcting optical system 140 in the Y-direction.

Figure 18:
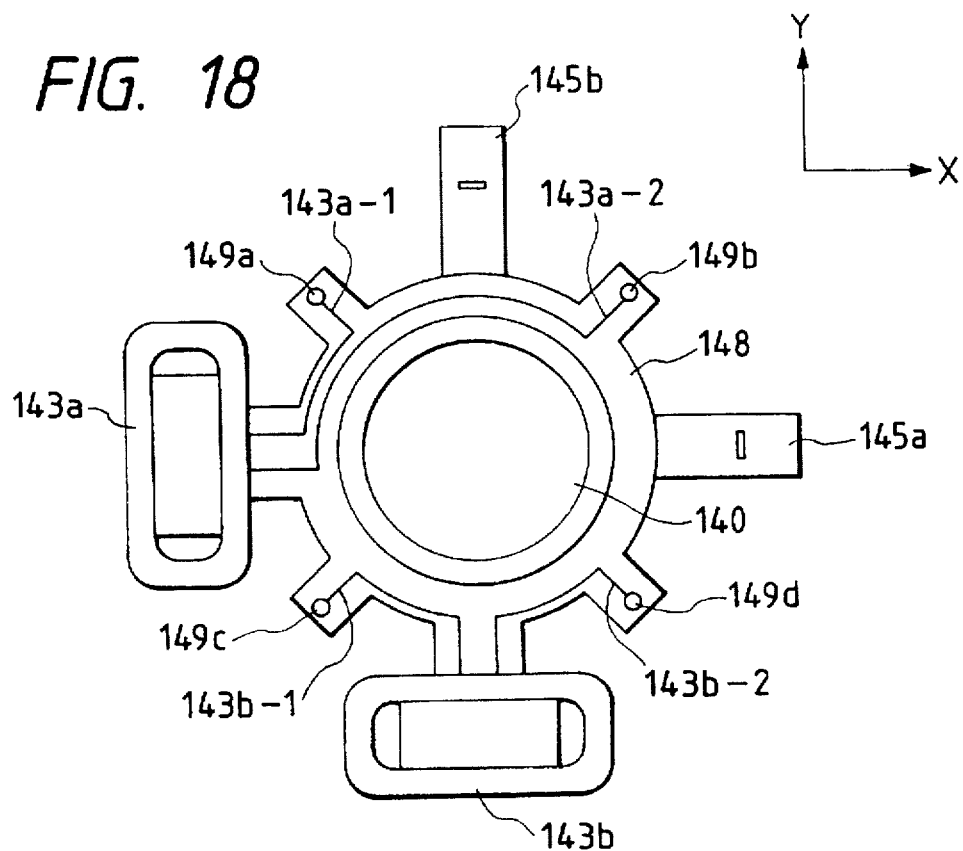
FIG. 18 is a detailed plan view of a vibration correcting optical system 148 and a lens chamber 148.

FIG. 18 is a detailed plan view of the vibration correcting optical system 140 and the lens chamber 148. Referring to FIG. 18, the coils 143a, 143b are mounted on the lens chamber 148, with a mutual interval of approximately 90° (in approximately mutually perpendicular directions). The lens chamber 148 is provided with lead wire portions 143a-1, 143a-2, 143b-1, 143b-2 electrically connected with the coils 143a, 143b, and these lead wire portions are electrically connected respectively with the supporting rods 149a to 149d.

Referring to FIG. 17, a top plate 150 and a bottom plate 151 are provided on both sides, in the axial direction, of the vibration correcting optical system 140. The yokes 144a, 144b are mounted on the top plate 150, while the magnets 141a, 141b and the yokes 142a, 142b are mounted on the bottom plate 151, in such a manner that the magnets 141a, 141b and the yokes 142a, 142b, 144a, 144b are positioned in a mutually opposed manner with appropriate distances to the coils 143a, 143b.

The position detecting unit is composed of light-emitting elements (IRED) 146a, 146b, photosensor elements (PSD) 147a, 147b and slit members 145a, 145b.

The slit members 145a, 145b are provided with apertures or slits for transmitting the lights emitted from the light-emitting elements 146a, 146b, and are integrally formed, with a mutual distance of approximately 90° about the optical axis, with the lens chamber 148 (cf. FIG. 18). The light-emitting elements 146a, 146b are fixed on the substrate 152, while the photosensor elements 147a, 147b are fixed on the bottom plate 151, in such a manner that the light-emitting elements 146a, 146b are opposed to the photosensor elements 147a, 147b across the slit members 145a, 145b.

Figure 19:
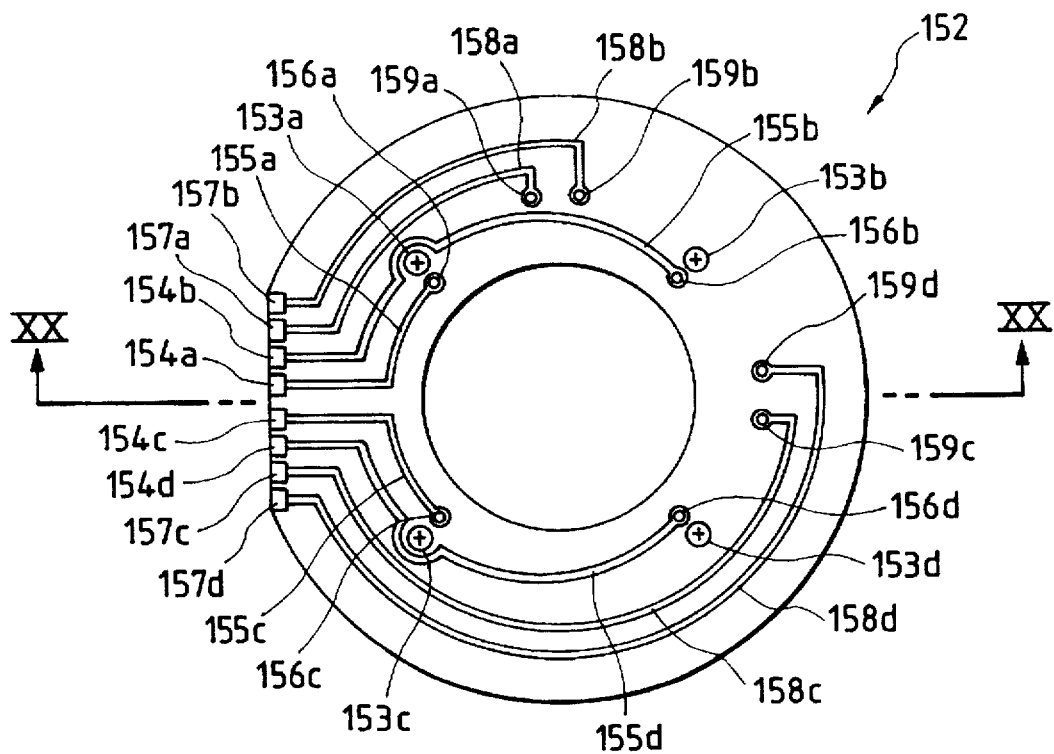
FIG. 19 is a detailed plan view of a substrate.

Outside the top plate 150 (opposite to the vibration correcting optical system 140) there is provided a substrate 152 which is shown in a detailed plan view in FIG. 19 and which is coupled with the top plate 150 by screws 153a, 153b, 153c, 153d.

The substrate 152 is provided at an end thereof with conductive terminals 154a, 154b, 154c, 154d; 157a, 157b, 157c, 157d, and further bears patterns 155a, 155b, 155c, 155d; 158a, 158b, 158c, 158d for transmitting electrical signals, which are electrically connected with the conductive terminals 154a to 154d, 157a to 157d and which are provided, at the ends thereof, with holes 156a, 156b, 156c, 156d; 159a, 159b, 159c, 159d.

In the holes 156a to 156d the supporting rods 149a to 149d are inserted and fixed by soldering, thereby being electrically connected to the patterns 155a to 155d. Consequently the electrical signals supplied to the conductive terminals 154a to 154d are transmitted to the coils 143a, 143b through the patterns 155a to 155d of the substrate 152, the supporting rods 149a to 149d and lead wire portions 143a-1, 143a-2, 143b-1, 143b-2.

The light-emitting element 146b is fixed by soldering to the holes 159a, 159b, and the light-emitting element 146a is fixed by soldering to the holes 159c, 159d, whereby the light-emitting elements 146a, 146b are electrically connected to the patterns 158a to 158d. Thus the electrical signals supplied to the lead wires 157a to 157d are transmitted to the light-emitting elements 146a, 146b through the patterns 158a to 158d of the substrate 152.

The above-explained configuration allows the electrical signals to be transmitted to the coils 143a, 143b and the light-emitting elements 146a, 146b, while reducing the number of components and wiring members, thereby simplifying the structure and the assembly process. Also, the reduction of the number of components lowers the rate of failure.

When an electrical signal is supplied to the conductive terminal 154a, 154b of the substrate 152, it is transmitted to the coil 143a whereby the vibration correcting optical system 140 is driven in the X-direction by an electromagnetic force generated by the yokes 142a, 144a, the magnet 141a and the coil 143a of the drive force generating unit. Similarly, when an electrical signal is supplied to the conductive terminal 154c, 154d of the substrate 152, it is transmitted to the coil 143b whereby the vibration correcting optical system 140 is driven in the Y-direction by an electromagnetic force generated by the yokes 142b, 144b, the magnet 141b and the coil 143b of the drive force generating unit. In this manner the vibration correcting optical system 140 is driven in a direction substantially perpendicular to the optical axis, thereby correcting the image vibration.

The substrate 152 and the top plate 150 are mutually fixed with screws 153a to 153d in the vicinity of fixing points of the supporting rods 149a to 149d, so that they are maintained in mutual contact at such fixing points. Thus, the supporting rods 149a to 149d have a mutually equal effective length. Consequently the vibration correcting optical system 140 can be prevented from inclination when it is moved, thereby maintaining satisfactory optical performance. Also in case of mass production of the image vibration correcting devices, there can be maintained uniform optical performance even if the substrate 152 show fluctuation in the distortion.

The movement of the vibration correcting optical system 140 in the X-direction is detected by the light-emitting element 146a, the slit of the slit member 145a and the photosensor element 147a of the position detecting unit. More specifically, the light emitted from the light-emitting element 146a is transmitted by the slit of the slit member 145a and enters the photosensor element 147a, which detects the position of the center of gravity of the entering light and releases a corresponding current. Similarly, the movement of the vibration correcting optical system 140 in the Y-direction is detected by the light-emitting element 146b, the slit of the slit member 145b and the photosensor element 147b of the position detecting unit.

Figure 20:
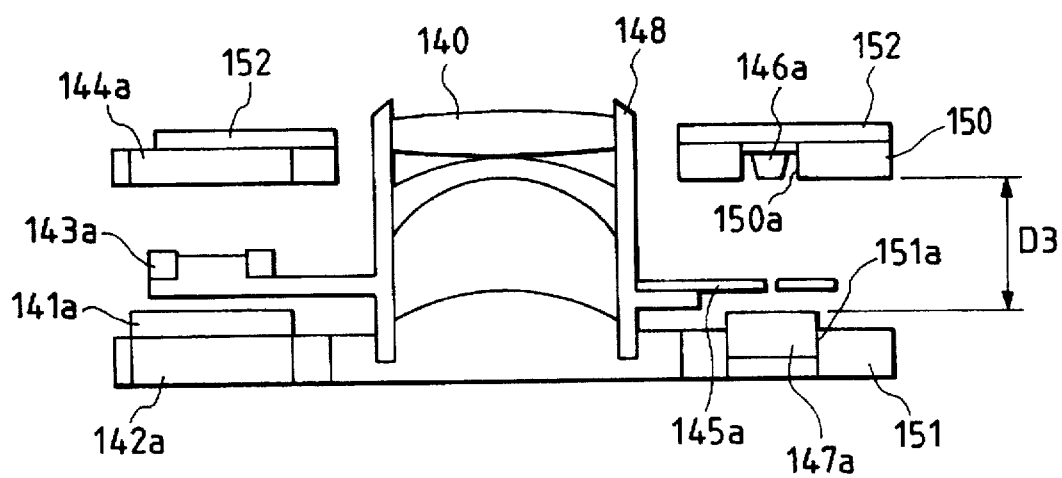
FIG. 20 is a cross-sectional view of the image vibration correcting device taken along a line XX—XX in FIG. 19.

FIG. 20 is a cross-sectional view of the image vibration correcting device taken along a line XX—XX in FIG. 19.

Figure 4:
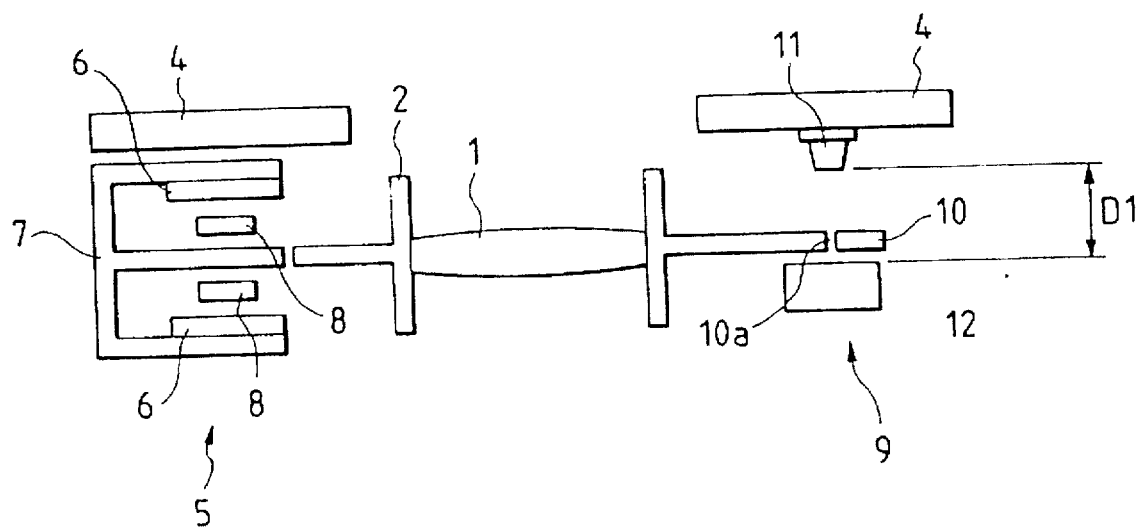
FIG. 4 is a cross-sectional view of a drive device for the vibration correcting optical system in a conventional image vibration correcting device.

The top plate 150 is provided with a hole 150a for accommodating the light-emitting element 146a, while the bottom plate 151 is provided with a hole 151a for accommodating the photosensor element 147a. Such configuration allows the distance D3 between the light-emitting element 146a and the photosensor element 147a, to be extended in comparison with the distance D1 in the conventional configuration (FIG. 4).

Figure 5A:
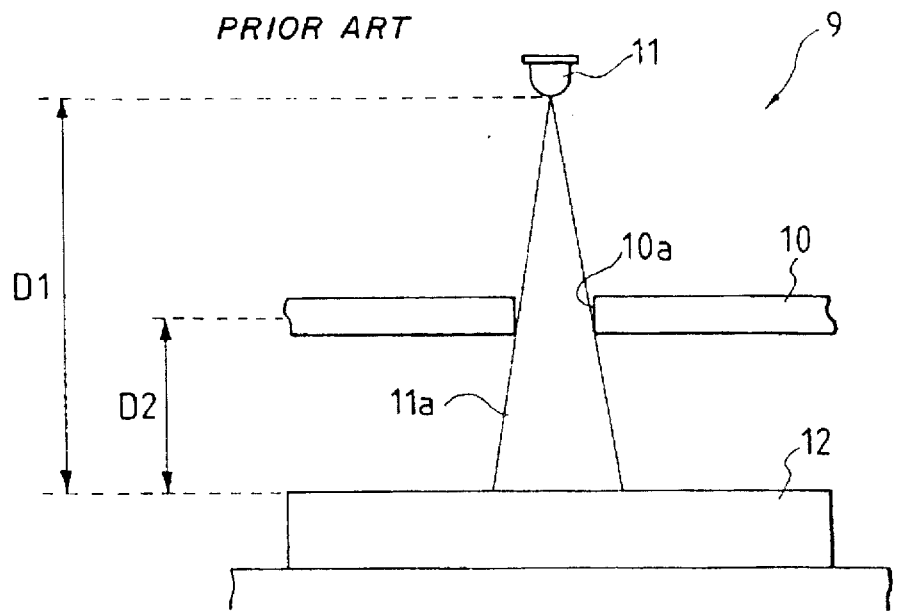
FIGS. 5A and 5B are views showing states of the transmitted light in a position detecting device 9.
Figure 5B:
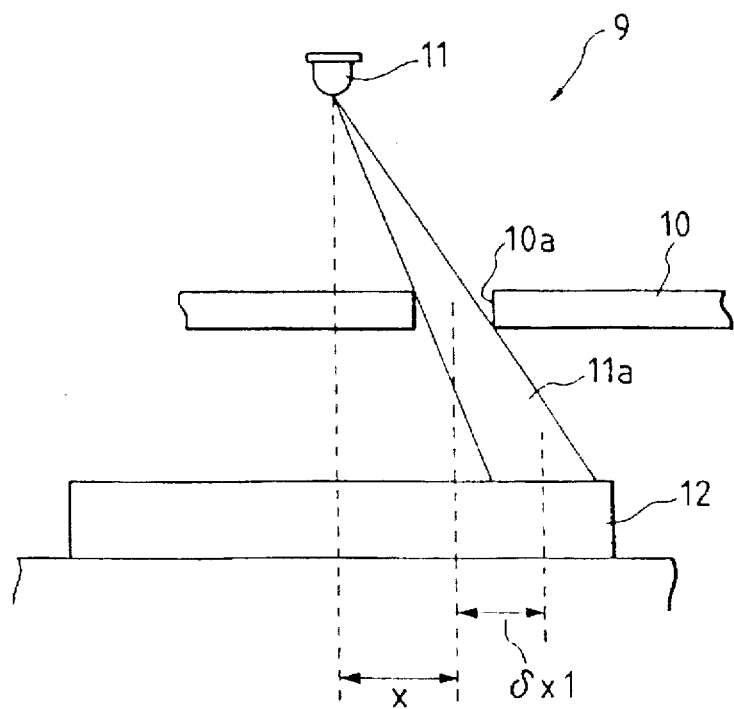
Figure 21A:
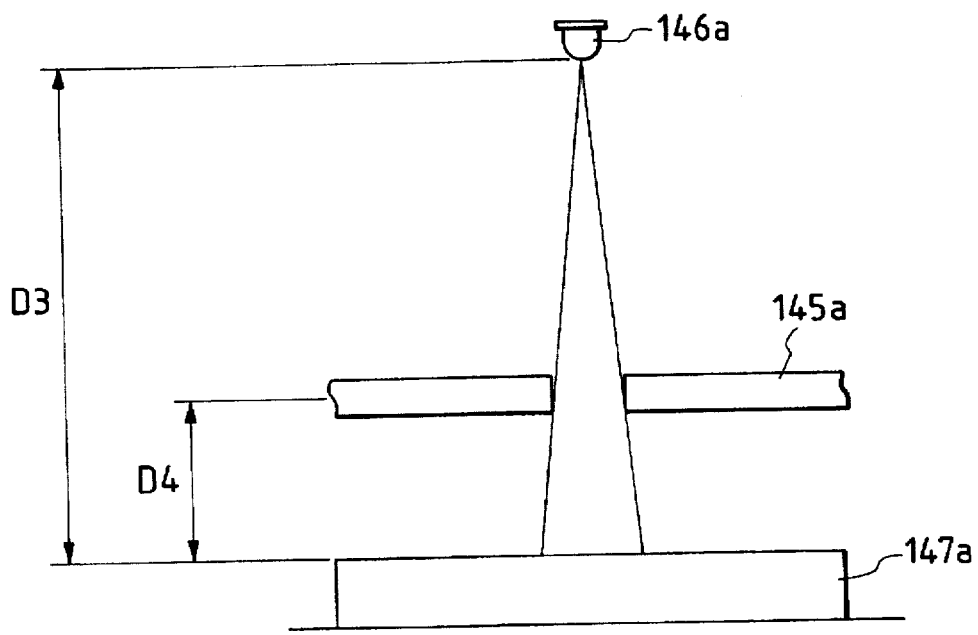
FIGS. 21A and 21B are views showing states of the transmitted light in a position detecting device in the third embodiment.
Figure 21B:
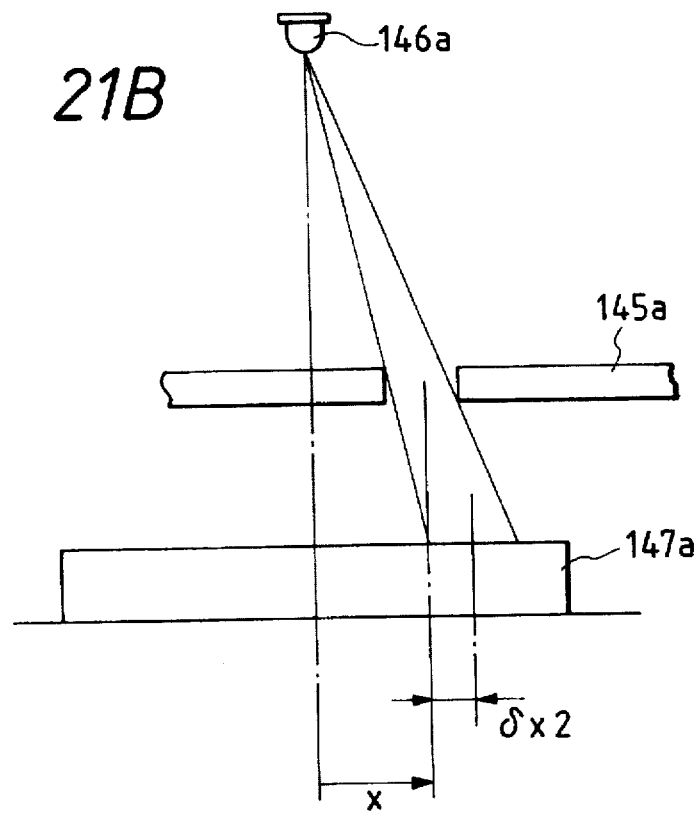

FIGS. 21A and 21B are views showing the state of light transmitted in the position detecting device of the present embodiment, corresponding to FIGS. 5A and 5B in the conventional configuration. As will be apparent from the comparison of these drawings, D3>D1 as explained above, while the distance D4 in the present embodiment is substantially same as D2 in the conventional configuration, so that $\delta x2 < \delta x1$ can be derived from the equation (1), wherein $\delta x2$ indicates the error between the slit position of the slit member 145a and the positional output of the photosensor element 147a in the present embodiment.

Thus, for a moving amount x of the slit of the slit member 145a, there stands a relationship $x + \delta x2 < x + \delta x1$. Therefore, even for a moving amount x for which the light from the slit falls out of the photosensor element and the detection of position becomes impossible in the conventional position detecting device, the position detecting device of the present embodiment can accept the light from the slit on the photosensor element and can detect the position. Also the extended distance between the light-emitting element 146a and the photosensor element 147a reduces the influence of eclipse (vignetting) of the light by the thickness of the slit member 145a.

Figure 6:
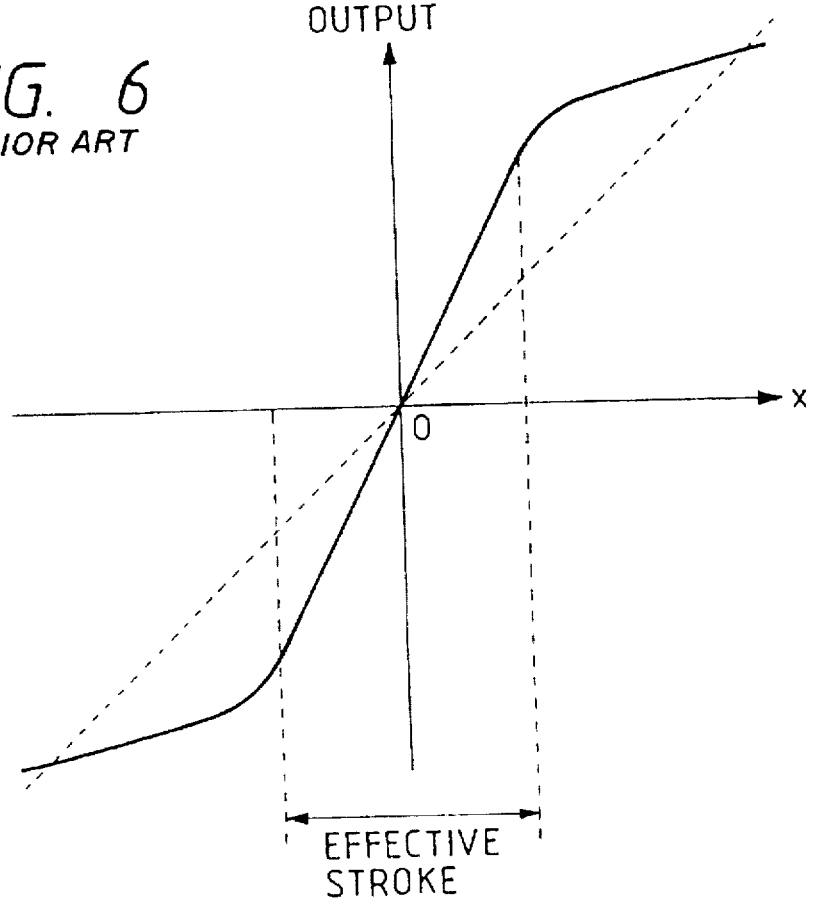
FIG. 6 is a chart showing the positional output of a photosensor element 12 as a function of the moving amount x of a slit 10a in the position detecting device 9.
Figure 22:
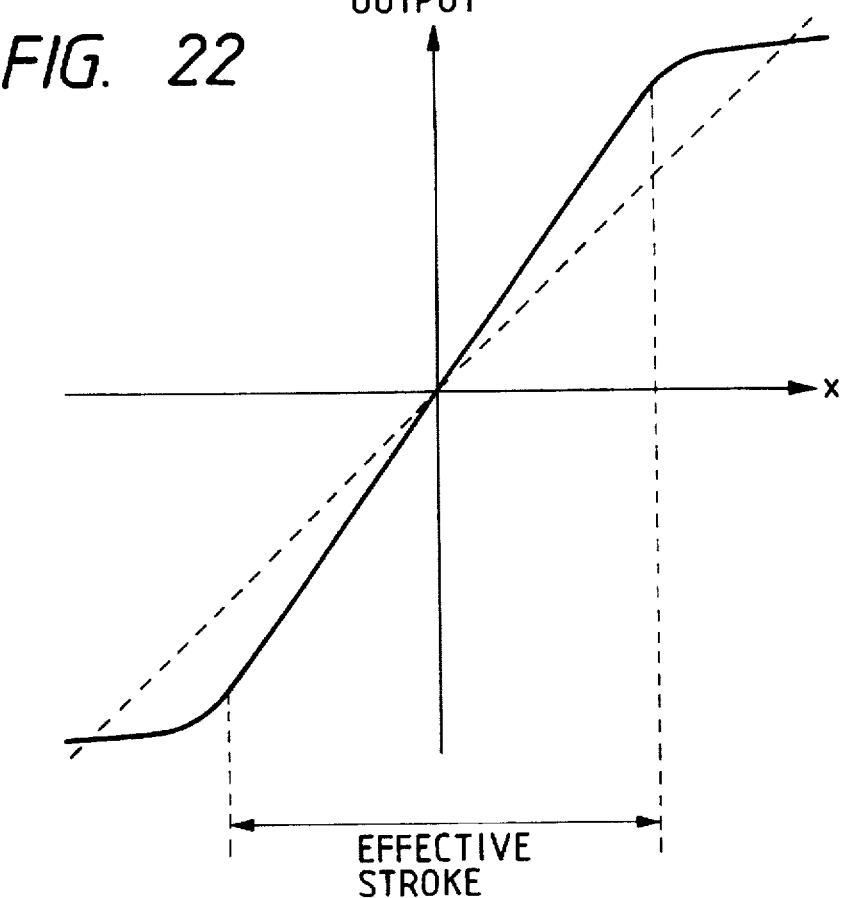
FIG. 22 is a chart showing the positional output of a photosensor element as a function of the moving amount of the slit of a slit member, in the position detecting device of the third embodiment.

FIG. 22 is a chart showing the positional output of the photosensor element 147a or 147b as a function of the moving amount x of the slit of the slit member 145a or 145b, in the position detecting device of the present invention, similar to the chart in FIG. 6 for the conventional configuration. In comparison with the conventional configuration, the distance between the light-emitting element 146a, 146b and the photosensor element 147a, 147b can be extended, thereby reducing $\delta x1$ in the equation (1) and also reducing the influence of eclipse (vignetting) of light by the thickness of the slit member 145a, 145b. As a result, the effective stroke can be made wider.

It is therefore made possible to increase the moving amount of the vibration correcting optical system 140, and to correct a large vibration that could not be corrected in the conventional configuration.

Figure 23A:
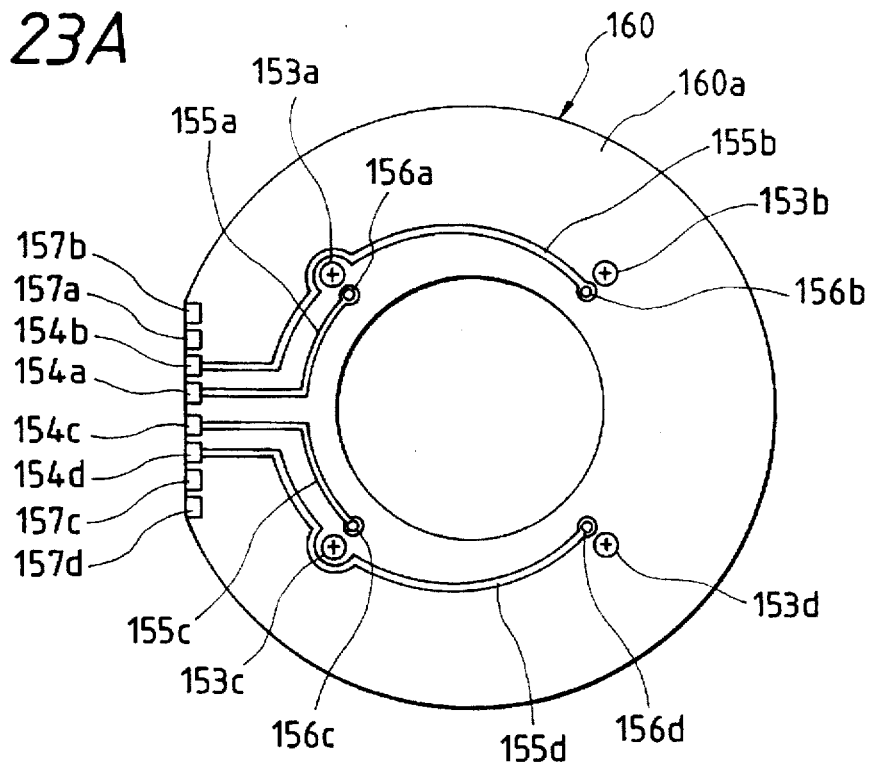
FIGS. 23A and 23B are plan views showing top and bottom sides of a substrate in a fourth embodiment of the image vibration correcting device of the present invention.
Figure 23B:
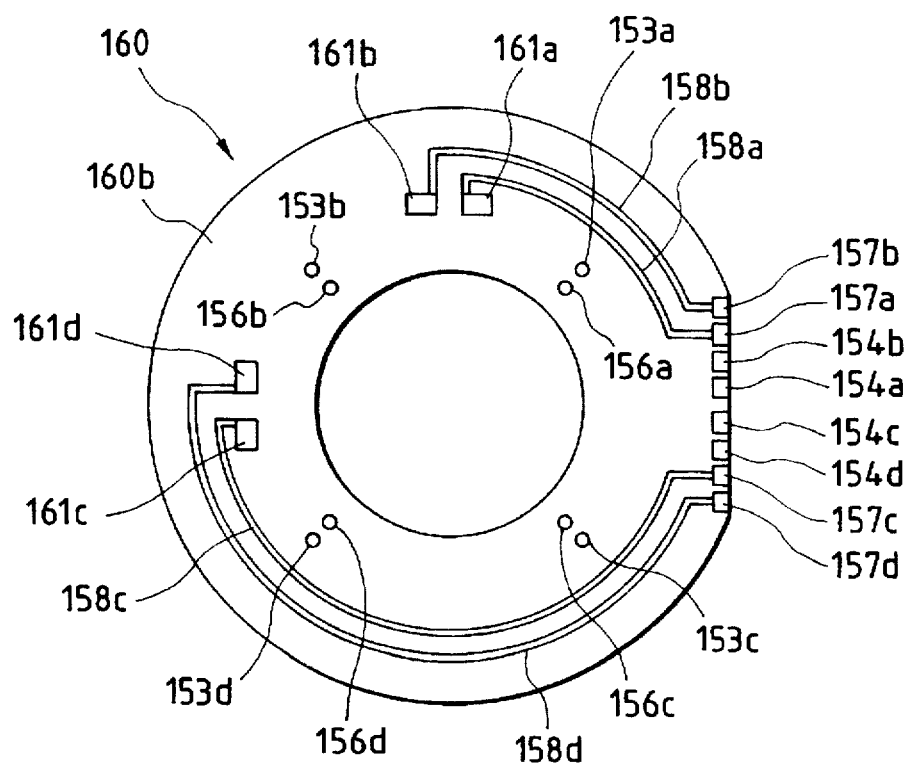

FIGS. 23A and 23B are plan views, respectively showing top side 160a and bottom side 160b, of a substrate 160 in a fourth embodiment of the image vibration correcting device of the present invention. The substrate 160 is a two-sided substrate bearing patterns on both faces thereof. In these drawings, components the same as those in the substrate 152 of the third embodiment (FIG. 19) are represented by the same numbers. On the bottom face 160b of the substrate 160 shown in FIG. 23B, conductive terminals 161a, 161b, 161c, 161d are provided for mounting the light-emitting elements 146a, 146b. Such a two-sided substrate allows chip-type light-emitting elements 146a, 146b, which are directly soldered to the conductive terminals 161a to 161d in the fourth embodiment, to be used.

Figure 24:
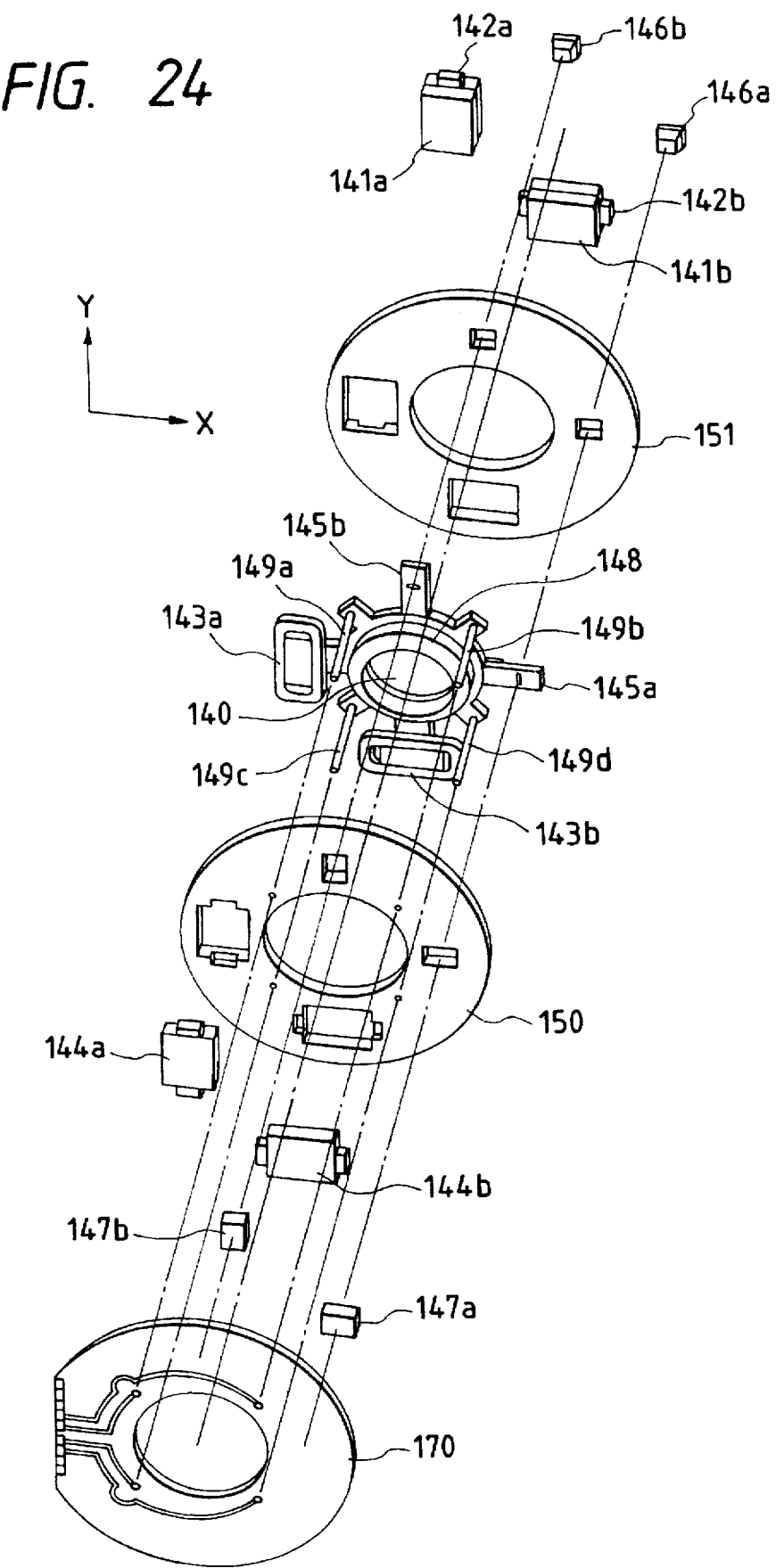
FIG. 24 is an exploded perspective view of a fifth embodiment of the image vibration correcting device of the present invention.
Figure 25A:
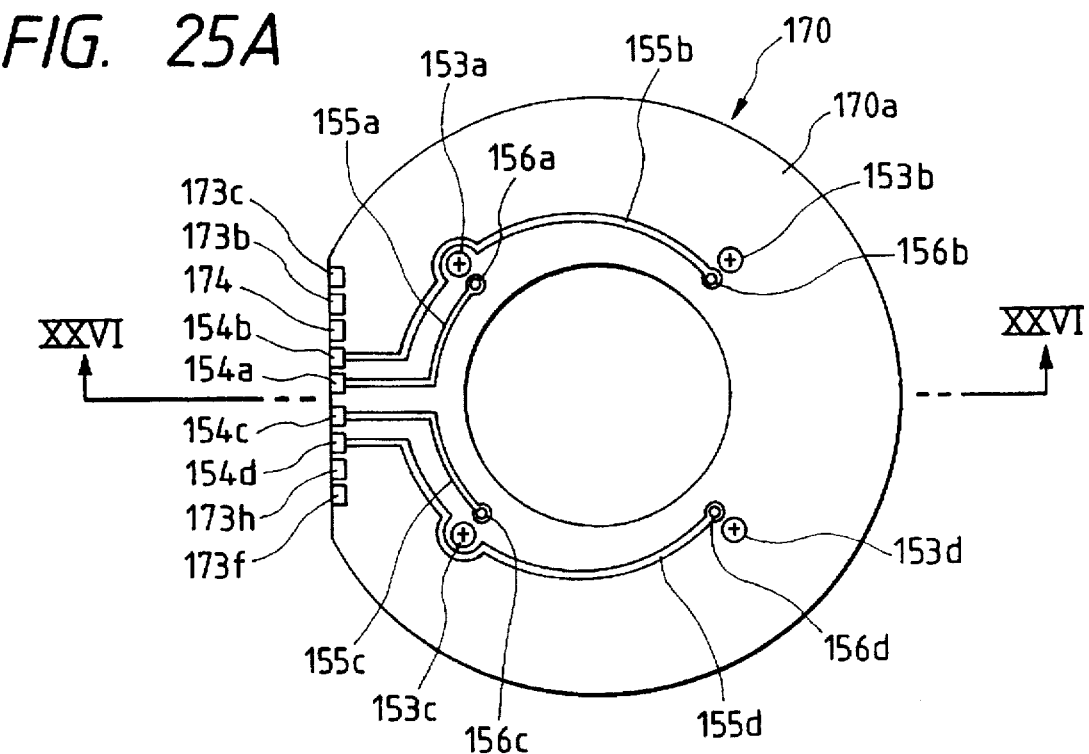
FIGS. 25A and 25B are plan views showing top and bottom sides of a substrate shown in FIG. 24.
Figure 25B:
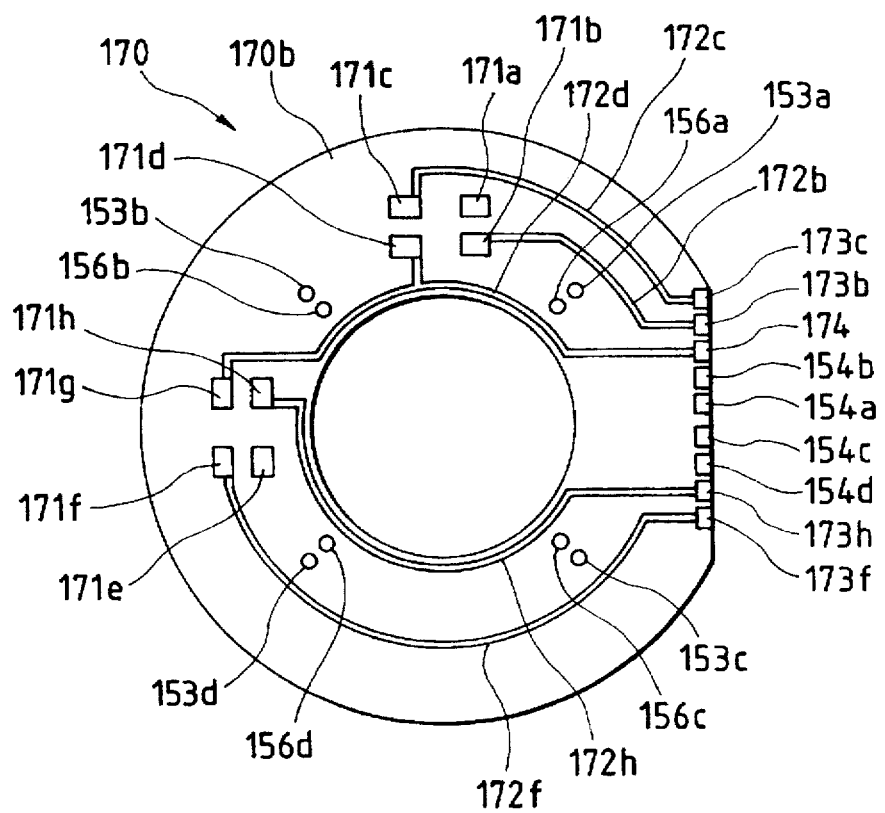

FIG. 24 is an exploded perspective view of a fifth embodiment of the image vibration correcting device of the present invention, which is different from the foregoing third embodiment (FIG. 17) in that the light-emitting elements 146a, 146b are mounted on the base plate 151, and the photosensor elements 147a, 147b are mounted on a substrate 170. FIGS. 25A and 25B are plan views, respectively showing top side 170a and bottom side 170b, of the substrate 170 in FIG. 24. The substrate 170 is a two-sided substrate bearing patterns on both faces thereof. In these drawings, components the same as those in the substrate 152 of the third embodiment (FIG. 19) are represented by the same numbers.

The substrate 170 is provided with conductive terminals 171a, 171b, 171c, 171d, 171e, 171f, 171g, 171h, and the photosensor elements 147b, 147a are respectively soldered to the terminals 171a to 171d and 171e to 171h. The terminals 171b, 171c are respectively connected electrically to the terminals 173b, 173c, through patterns 172b, 172c. Similarly, the terminals 171f, 171h are respectively connected electrically to the terminals 173f, 173h, through patterns 172f, 172h. Also the terminals 171d, 171g are electrically connected to a conductive terminal 174, through a pattern 172d.

The terminals 171b, 171c are soldered to the anode of the photosensor element 147b, while the terminals 171f, 171h are soldered to the anode of the photosensor element 147a. Each of the photosensor elements 147a, 147b releases a current from the anode thereof, according to the position of the received light on the light-receiving face thereof. As the anodes of the photosensor elements 147a, 147b are electrically connected to the conductive terminals 173b, 173c, 173f, 173h on the substrate 170, the outputs of the photosensor elements 147a, 147b, can be read from the above-mentioned conductive terminals. Also the conductive terminals 171a, 171d are soldered to the cathode of the photosensor element 147b, while the conductive terminals 171e, 171g are soldered to that of the photosensor element 147a. The cathodes mounted to the terminals 171d, 171g are connected in common to a conductive terminal 174, which can therefore be used for applying a bias potential to the two photosensor elements 147a, 147b. However, it is also possible to separate the cathodes of the photosensor elements 147a, 147b and to apply different bias voltages thereto.

The mounting of the supporting rods 149a to 149d and the two photosensor elements 147a, 147b on the same substrate 170 allows the vibration correcting optical system 140 to be driven and to achieve an electrical process relating to the photosensor elements 147a, 147b, by merely attaching a flexible printed circuit substrate, bearing nine patterns, to the conductive terminals 154a to 154d, 173b, 173c, 173f, 173h and 174. It is thus rendered possible to reduce the number of components and to reduce the rate of failure, in comparison with the conventional configuration.

Figure 26:
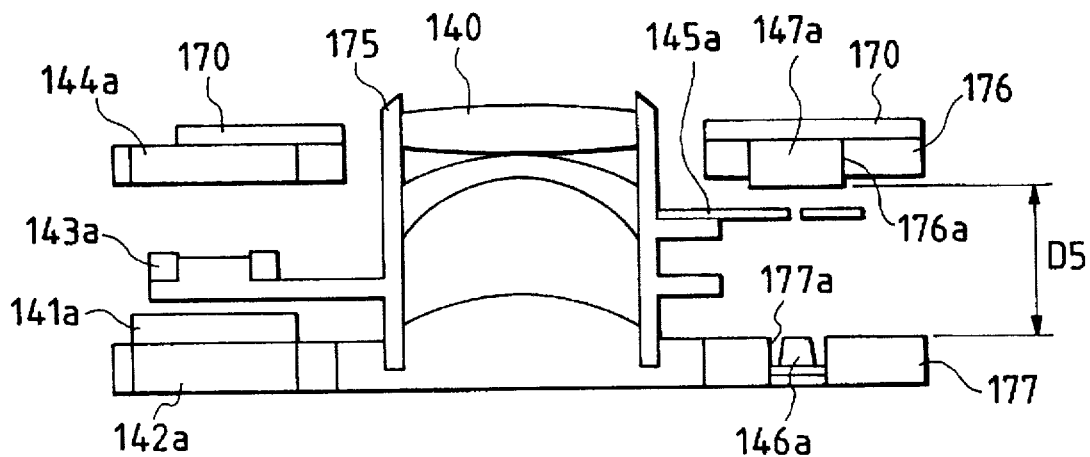
FIG. 26 is a cross-sectional view of the image vibration correcting device taken along a line XXVI—XXVI in FIG. 25A.

FIG. 26 is a cross-sectional view of the image vibration correcting device taken along a line XXVI—XXVI in FIG. 25A, wherein components same as those in FIG. 20 are represented by same numbers. This embodiment is different from the third embodiment in the form of the lens chamber 175, in such a manner that the distance between the slit member 145a and the photosensor element 147a becomes similar to that in the third embodiment. This is to prevent the limitation in the effective stroke, resulting from the increase of δx1 in the equation (1) when the distance D2 increases. Referring of FIG. 26, the photosensor element 147a mounted on the substrate 170 is so positioned as to be accommodated in a hole 176a provided on the top plate 176, while the light-emitting element 146a is so positioned as to be accommodated in a hole 177a formed on the bottom plate 177, whereby the distance D5 between the light-emitting element 146a and the photosensor element 147a can be extended in comparison with the conventional configuration. It is thus made possible to improve the precision of the position detecting unit and to increase the moving amount of the vibration correcting optical system 140, thereby enabling even a large vibration to be corrected that cannot be corrected in the conventional technology.

The present invention is not limited to the foregoing embodiments, but is subject to various modifications within the scope of equivalence.

For example, the position detecting unit explained in the foregoing is composed of a light-emitting element, a slit and a photosensor element and is based on an optical principle, but the detection of position may also be achieved by other means, for example by a magnetic sensor such as an MR sensor. Also if the image vibration correcting device has a surplus space, the driver circuit of the actuator or the like may be mounted on the substrate 152. Also the image vibration correcting device of the foregoing embodiment is applicable not only to a camera but also to other image taking devices.

The present embodiment does not employ a large number of wiring members, and allows the number of components to be reduced and the structure and the assembly operation to be simplified. Also such reduction in the number of components leads to a lowered rate of failure.

Also the present embodiment, being capable of extending the distance between the light-emitting element and the photosensor element, allows detection of position even for a large image vibration, and reduces the influence of eclipse (vignetting) of light by the thickness of the slit member.

Figure 27:
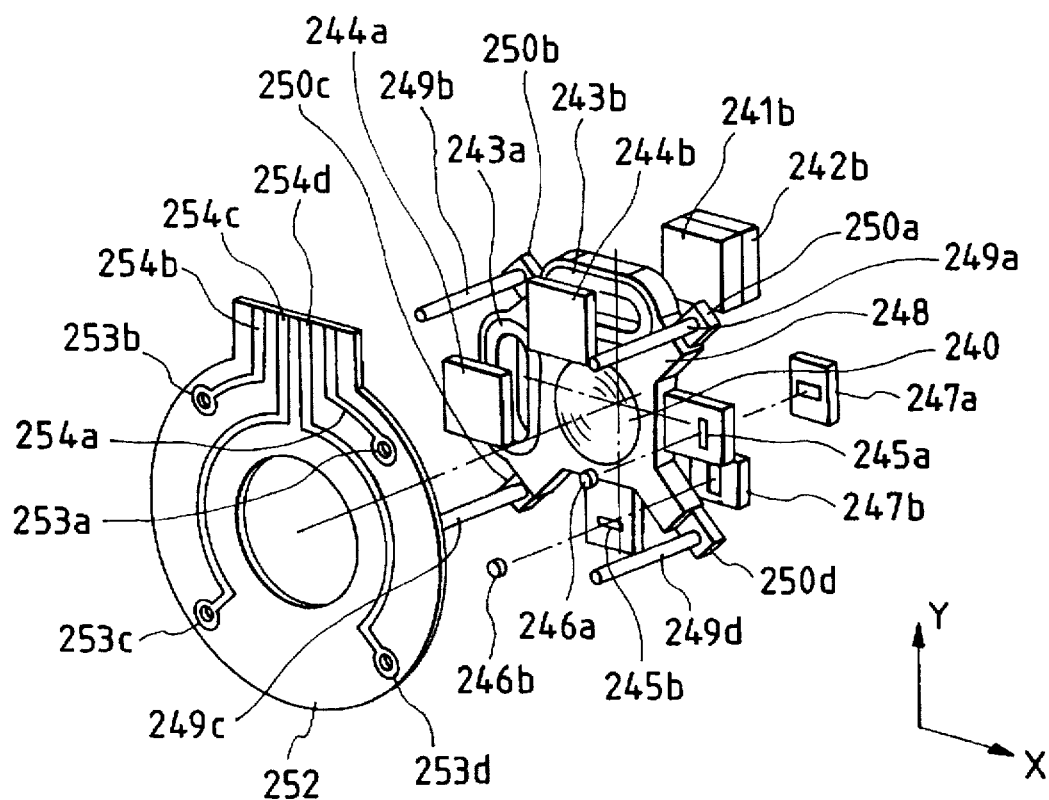
FIG. 27 is a perspective view of a sixth embodiment of the image vibration correcting device of the present invention.

FIG. 27 is a perspective view of a sixth embodiment of the image vibration correcting device of the present invention, wherein a drive force generating unit for driving the vibration correcting lens or vibration correcting optical system 240 in the Y-direction is composed of a coil 243b, a magnet 241b, and yokes 242b, 244b. Similarly a drive force generating unit for driving the vibration correcting optical system 240 in the X-direction is composed of a coil 243a, a magnet 241a (not shown), and yokes 242a (not shown), 244a. The coils 243a, 243b are integrally formed with a lens chamber 248 for fixing the vibration correcting optical system 240.

Figure 28:
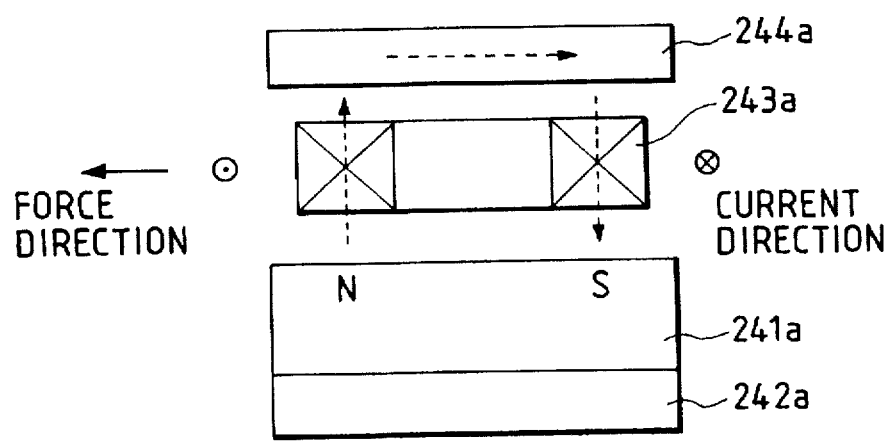
FIG. 28 is a detailed view of a drive power generating unit.

FIG. 28 shows the details of the drive force generating unit, wherein shown are a magnet 241a magnetized with two poles, yokes 242a, 244a composed of a material of a high magnetic permeability such as iron, and a coil 243a wound around a direction parallel to the optical axis. On the yoke 242a, the magnet 241a magnetized with two poles is mounted by the magnetic force thereof. The yoke 244a is mounted, opposed to the magnet 241a and across the coil 243a. A magnetic circuit, represented by broken-lined arrows, is formed by the magnet 241a and the yokes 242a, 244a. A current supply to the coil 243a present in such a magnetic circuit generates an electromagnetic force in a direction, indicated by a solid-lined arrow, perpendicular to the direction of current and the direction of magnetic flux, according to Flemming's left hand rule.

Consequently, when the magnet 241a and the coil 243a are positioned as shown in FIG. 27, the current supply thereto generates a force in the X-direction. Similarly a Y-driving actuator composed of a magnet 241b, a yoke 242b and a coil 243b generates a force in the Y-direction by a current supply to the coil 243b.

As shown in FIG. 27, the motion of the vibration correcting optical system 240 is monitored by optical position detecting devices, namely by photosensor elements 247a, 247b which are provided respectively for the X- and Y-directions. The photosensor elements 247a, 247b are composed of PSD (position sensitive devices) which are composite photodiodes. On the lens chamber 248 for fixing the vibration correcting optical system 240, there are mounted slit members 245a, 245b composed of a composite material with a low surfacial infrared reflectance. The slit member 245a for the detection in the X-direction is provided with a slit elongated in the Y-direction, and the slit member 245b for the detection in the Y-direction is provided with a slit elongated in the X-direction.

The light emitted by the IRED 246a is transmitted by the slit of the slit member 245a mounted on the lens chamber 248, and enters the one-dimensional PSD 247a for positional detection. The light entering the one-dimensional PSD 247a moves according to the motion of the slit of the slit member 245a mounted on the lens chamber 248, namely according to the motion of the vibration correcting optical system 240. The length of the detecting portion of the PSD can be decreased by increasing the distance between the IRED and the PSD and decreasing the distance between the slit and the PSD, so that the PSD can be made compact. However, an increased distance between the IRED and the PSD decreases the absolute amount of light entering the PSD, thereby deteriorating the S/N ratio. Consequently it is usual to position the slit and PSD as close as possible without mutual contact, and to increase the distance between the IRED and the PSD as far as is tolerable in consideration of the S/N ratio.

The lens chamber 248, supporting the vibration correcting optical system 240, is supported by four elastic support members 249a, 249b, 249c, 249d of a material of a high electroconductivity, for example a copper alloy such as beryllium copper or phosphor bronze, or a non-copper alloy elastic support member with a conductive surface treatment such as gold or nickels plating. Such elastic support members 249a to 249d are mounted in copper pieces 250a, 250b, 250c, 250d integrally inserted in the lens chamber 248. The copper pieces 250a to 250d are provided with holes in the axial direction, and the elastic support members 249a to 249d are inserted into such holes and soldered. The internal diameter of the hole provided in each of the copper pieces 250a to 250d does not exceed the diameter of the elastic support members plus 0.5 mm.

This is because the solder flows to the elastic region of the elastic support member if the diameter of the hole is excessively large. Such solder flow in the elastic region of the elastic support member can be prevented by maintaining the clearance between the internal diameter of the hole and the external diameter of the elastic support member within 0.5 mm. An eventual deposition of solder in the elastic region of the elastic support member varies the spring constant thereof, thereby varying the first-order resonance frequency of the spring-mass system constituted by the lens chamber 248 and the elastic support members. Also if the four elastic support members 249a to 249d have different elastic regions, there may result an inclination in the vibration correcting optical system 240 when the lens chamber 248 is moved in a plane perpendicular to the optical axis. This is because the lens chamber 248 is supported by the four elastic support members 249a to 249d thereby constituting a link mechanism as explained in the foregoing.

Figure 29:
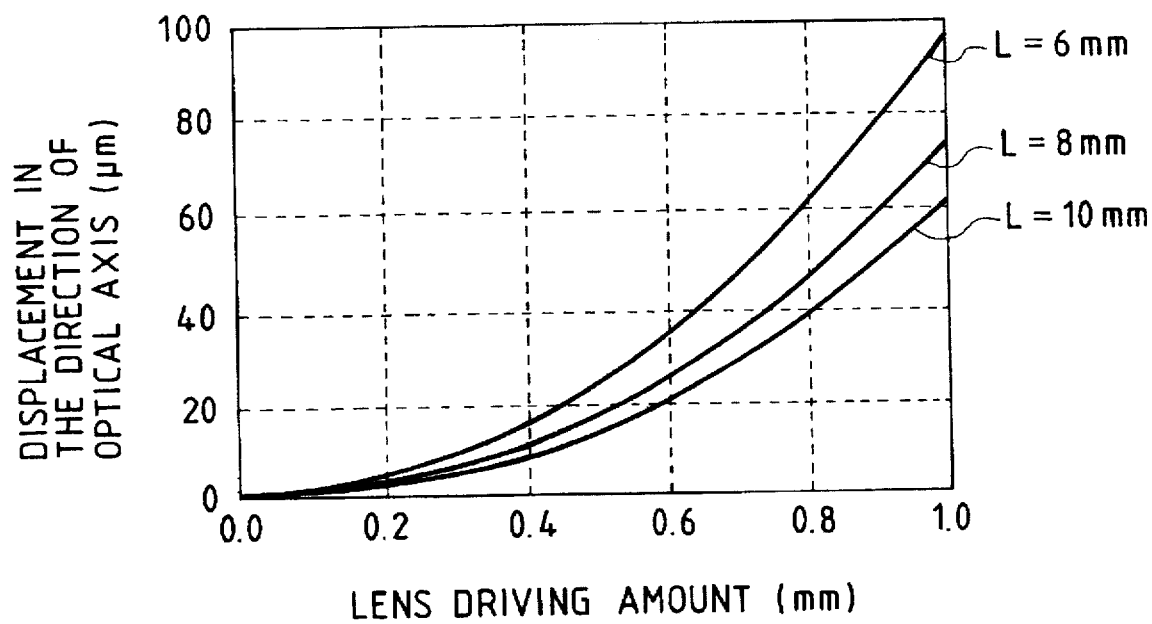
FIG. 29 is a chart showing the axial displacement of the lens chamber as a function of the moving amount thereof in a plane perpendicular to the optical axis.

FIG. 29 is a chart showing the axial displacement of the lens chamber as a function of the motion thereof in a plane (vibration correcting drive plane) perpendicular to the optical axis. According to the FIG. 29, the axial displacement is about 70 μm when the elastic support members have a length of 8 mm and the vibration correcting lens moves by 1.0 mm. If the length of the elastic region is reduced to 6 mm by the deposition of solder on the elastic support members, the axial displacement of the vibration correcting lens increases to 100 μm. Also if the length of the elastic region is reduced from 8 mm to 6 mm in one of the four elastic support members, the vibration correcting lens is inclined by 5 minutes at maximum for a driving amount of 1.0 mm, when such elastic support members are mutually distanced by 20 mm. By maintaining the clearance between the diameter of the holes provided in the copper pieces 250a to 250d and the diameter of the elastic support members 249a to 249d within 0.5 mm, it is rendered possible to prevent solder flow to the elastic region thereof, thereby precisely driving the vibration correcting optical system 240.

Figure 30:
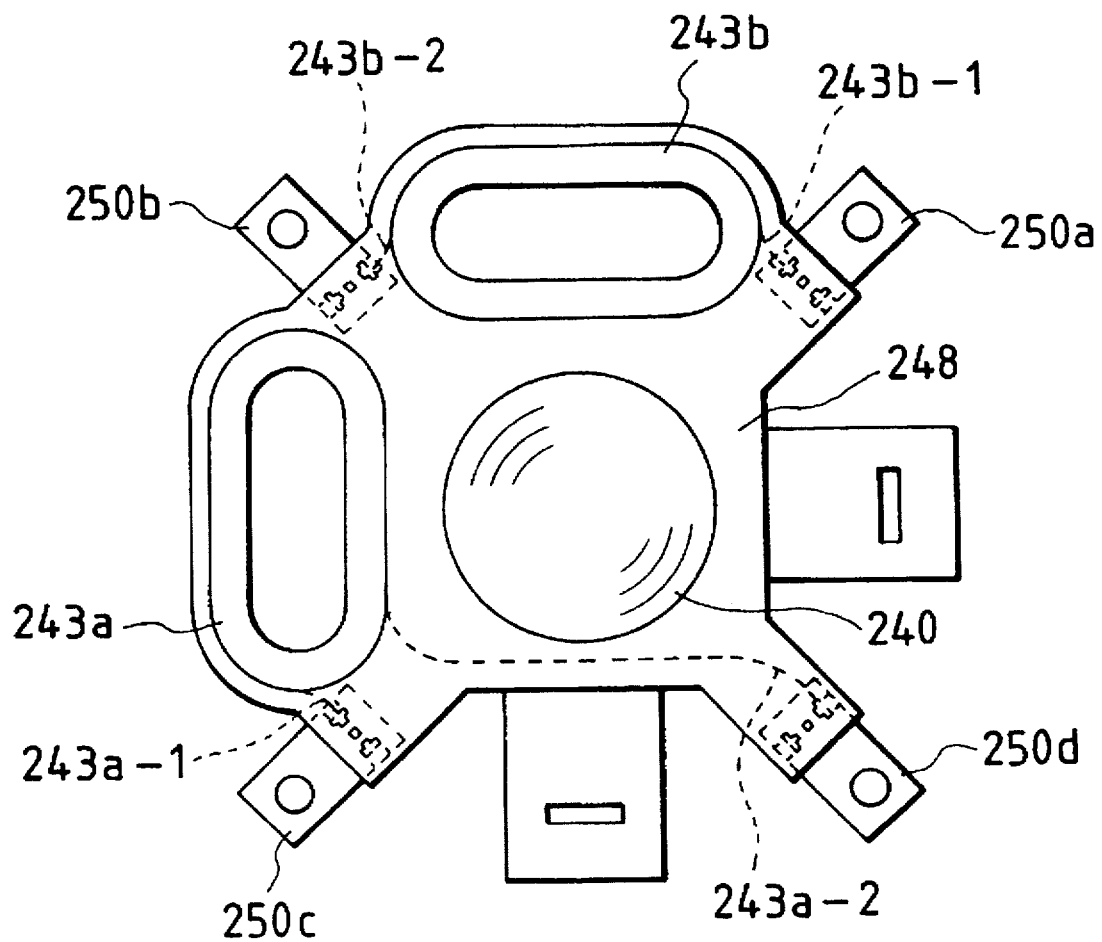
FIG. 30 is a view showing the structure inside the mold of the lens chamber.

FIG. 30 shows the molded internal structure of the lens chamber 248. The copper pieces 250a to 250d, integrally inserted into the lens chamber 248, are connected, inside the lens chamber 248, to the terminal wires 243a-1, 243a-2, 243b-1, 243b-2 of the coils 243a, 243b. More specifically, the copper pieces 250a, 250b are connected, inside the lens chamber 248, to the terminal wires 243b-1, 243b-2 of the Y-direction driving coil 243b, and the copper pieces 250c, 250d are connected to the terminal wires 243a-1, 243a-2 of the X-direction driving coil 243a. The connecting portion is soldered, after the terminal lead wire of the coil is wound around the copper piece. The coil wire, being a copper wire as thin as about 0.1 mm, may be easily broken by mishandling at the assembling operation or by contact with a fixed member at the motion of the vibration correcting optical system 240, if such wire is exposed to the outside. The vibration correcting optical system 240 cannot be driven if the wire of the coil 243a or 243b is broken, and such trouble can be prevented by passing the terminal wires of the coils 243a, 243b inside the mold.

In molding the lens chamber 248, at first the terminal wires 243a-1, 243a-2, 243b-1, 243b-2 of the coils 243a, 243b are wound around the copper pieces 250a to 250d and soldered. The copper pieces 250a to 250d have to have holes for positioning in the mold and a sufficient size for fixing in the mold. Then the copper pieces 250a to 250d, together with the terminal wires of the coils 243a, 243b, are fixed in the mold, and a resinous material is poured therein. Finally unnecessary portions of the copper pieces 250a to 250d are cut off. Such molding operation of the lens chamber 248 allows to obtain an assembled part, in which the terminal wires of the coils 243a, 243b are already processed therein without exposure to the outside.

Figure 31:
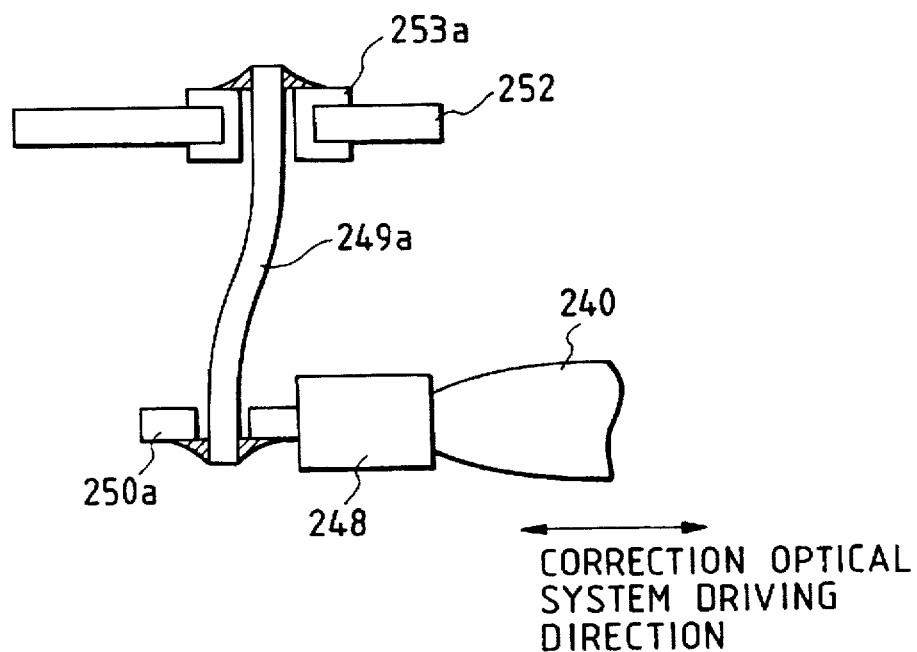
FIG. 31 is a cross-sectional view of a mounting portion of an elastic support member onto an electric circuit substrate.
Figure 32:
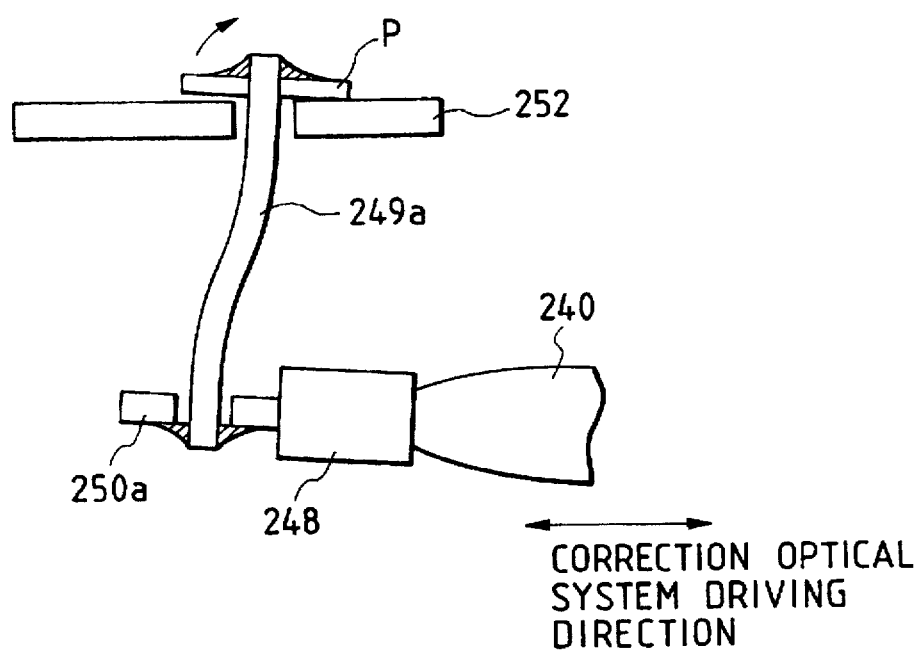
FIG. 32 is a cross-sectional view of the electric circuit substrate in a state where a wiring pattern thereof is peeled off.

As shown in FIG. 27, the elastic support members 249a to 249d are fixed, by soldering, to throughhole members 253a, 253b, 253c, 253d of an electric circuit substrate 252. FIG. 31 shows the cross section of a mounting portion of the elastic support members 249a to 249d and the substrate 252. The elastic support member 249a is soldered through a throughhole member 253a provided in the substrate 252. If the soldering is made to an ordinary circuit pattern P without the throughhole member 253a, the driving of the vibration correcting optical system 240 induces a moment in a direction to peel such a pattern, whereby the pattern P may be peeled off from the substrate 252 as shown in FIG. 32, after repeated drives, and such peeling of the pattern P generates an inclination in the vibration correcting optical system 240, thereby deteriorating the resolving power. The use of the throughhole members 253a to 253d instead of the ordinary pattern P prevents such pattern peeling, thereby allowing the precision of supporting of the vibration correcting optical system 240 to be maintained. The clearance between the internal diameter of the throughhole members 253a to 253d and the diameter of the elastic support members 249a to 249d is preferably maintained within 0.5 mm, for the same reason as the clearance between the internal diameter of the holes of the copper pieces 250a to 250d and the diameter of the elastic support members 249a to 249d, in order to solder deposition on the elastic region thereof.

As shown in FIG. 27, the throughhole members 253a to 253d are electrically connected with patterns 254a, 254b, 254c, 254d on the substrate 252, so that currents can be supplied from these patterns 254a to 254d to the coils 243a, 243b through the elastic support members 249a to 249d.

The above-explained embodiment is featured, in the first place, by having a vibration correcting optical system adopted to so move as to correct the image vibration resulting from the vibration of the image taking device, plural elastic support members supporting the vibration correcting optical system so as to be movable in a plane perpendicular to the optical axis of the image taking device, an electric circuit substrate fixing the elastic support members, and throughhole members for fixing the elastic support members on the elastic circuit substrate, thereby stably supporting the vibration correcting optical system and increasing the durability of the vibration correcting device.

In the second place, it is featured by a fact that the clearance between the internal diameter of the throughhole members and the external diameter of the elastic support members is maintained within 0.5 mm, thereby maintaining uniform performance of the vibration correcting device.

In the third place, it is featured by having a vibration correcting optical system adapted to so move as to correct the image vibration resulting from the vibration of the image taking device, an electromagnetic drive device for driving the vibration correcting optical system, coils constituting the electromagnetic drive device, and a support member for supporting the coils, wherein the coils are integrally molded with the support member to improve the assembling property of the vibration correcting device.

In the fourth place, the coil support member serves also as the lens chamber of the vibration correcting optical system, thereby improving the assembling property of the vibration correcting device.

In the fifth place, the terminals for current supply to the coils and the lead wires thereof are electrically connected through the interior of the coil support member, whereby achieved is improvement in the production yield of the vibration correcting device and in the reliability thereof.

In the sixth place, there are provided plural elastic support members for supporting the vibration correcting optical system movably in a plane perpendicular to the optical axis of the image taking device, and the elastic support members are fixed to the terminals which are integrally molded with the coil support member, whereby achieved is improvement in the production yield of the vibration correcting device and in the reliability thereof.

In the seventh place, the terminals are provided with holes for fixing the elastic support members, with a clearance between the internal diameter of the holes and the external diameter of the elastic support members not exceeding 0.5 mm, thereby maintaining uniform performance of the vibration correcting device.

As explained in the foregoing, the image vibration correcting device of the present invention comprises a vibration correcting optical system so movable as to correct the image vibration, plural elastic support members for supporting the vibration correcting optical system movably in a plane perpendicular to the optical axis of the image taking device, and an electric circuit substrate for fixing the elastic support members, wherein the electric circuit substrate is provided with throughhole members for fixing the elastic support members, so that the elastic support members supporting the vibration correcting optical system can be securely fixed by soldering.

It also comprises a vibration correcting optical system so movable as to correct the image vibration, an electromagnetic drive device for driving the vibration correcting optical system, coils constituting the electromagnetic drive device, and a coil support member for supporting the coils, wherein the coils are integrally molded with the coil support members, so that there can be reduced the number of assembly steps required for handling the terminal wires of the coils for driving the vibration correcting optical system.

What is claimed is:

1. An image vibration correcting device comprising:
   a vibration correcting optical system so movable as to vary an optical axis of a phototaking optical system in order to correct an image vibration resulting from vibration;
   a drive force generating unit including a magnetic member and a coil, to generate an electromagnetic force for driving said vibration correcting optical system;
   a substrate bearing a pattern to transmit an electrical signal; and
   a support member composed of a conductive elastic material, supporting said vibration correcting optical system and electrically connecting said pattern on said substrate with said coil in said drive force generating unit.

2. An image vibration correcting device according to claim 1, further comprising:
   a mounting plate provided between said substrate and said vibration correcting optical system and supporting said magnetic member of said drive force generating unit.

3. An image vibration correcting device according to claim 2, wherein said support member is fixed to said substrate, and said mounting plate is so formed as to be free of contact with said support member.

4. An image vibration correcting device according to claim 2, wherein said substrate and said mounting plate are integrated by a fixing portion.

5. An image vibration correcting device according to claim 4, wherein said substrate is screw coupled with said mounting plate, in the vicinity of a connecting portion of said support member and said pattern.

6. An image vibration correcting device according to claim 4, wherein the number of said fixing portions is at least equal to that of said support members.

7. An image vibration correcting device according to claim 2, wherein the rigidity of said mounting plate is at least equal to that of said substrate.

8. An image vibration correcting device according to claim 1, wherein said substrate is so shaped as not to intercept said optical axis.

9. An image vibration correcting device comprising:
   a vibration correcting optical system so movable as to vary an optical axis of a phototaking optical system in order to correct an image vibration resulting from vibration;
   a substrate bearing a pattern to transmit an electrical signal; and
   a position detecting unit to detect a position of said vibration correcting optical system;
   wherein at least a part of the components of said position detecting unit is provided on said substrate and is electrically connected with said pattern on said substrate.

10. An image vibration correcting device according to claim 9, wherein said position detecting unit includes a light-emitting element and a photosensor element to detect a position of said vibration correcting optical system; and one of said light-emitting element and said photosensor element is provided on said substrate and is electrically connected with said pattern thereon.

11. An image vibration correcting device according to claim 9, further comprising:
   a drive force generating unit including a magnetic member and a coil, to generate an electromagnetic force to drive said vibration correcting optical system; and
   a support member composed on a conductive elastic material, supporting said vibration correcting optical system and electrically connecting said pattern on said substrate with said coil in said drive force generating unit.

12. An image vibration correcting device according to claim 11, further comprising:
   a mounting plate provided between said substrate and said vibration correcting optical system and supporting said magnetic member of said drive force generating unit;
   wherein said substrate is fixed to said mounting plate, and said magnetic member is positioned in a recess formed in said mounting plate.

13. An image vibration correcting device according to claim 11, further comprising:
   a driver circuit provided on said substrate and adapted to drive said drive force generating unit.

14. An image vibration correcting device according to claim 12, wherein one of said light-emitting element and said photosensor element provided on said substrate is positioned in a recess formed in said mounting plate.

15. An image vibration correcting device comprising:
   a vibration correcting optical system so movable as to correct an image vibration resulting from vibration;

a frame to support said vibration correcting optical system;

plural elastic support members to support said frame so that said vibration correcting optical system is movable in a plane perpendicular to an optical axis of an image taking device; and an electric circuit substrate including plural throughhole members to respectively fix said elastic support members at an end thereof opposite said frame.

16. An image vibration correcting device according to claim 15, wherein said elastic support members are fixed to said throughhole members by soldering, and a clearance between an internal diameter of said throughhole members and an external diameter of said elastic support members is so maintained that the solder does not flow to an outside of said elastic support members.

17. An image vibration correction device comprising:

a vibration correcting optical system so movable as to correct an image vibration resulting from vibration;

an electromagnetic drive device to drive said vibration correcting optical system;

a coil constituting said electromagnetic drive device;

a coil support member to support said coil;

a substrate having an electrical pattern formed thereon; and an elastic support member to support said vibration correcting optical system and separate said vibration correcting optical system from said substrate.

18. An image vibration correcting device according to claim 17, further comprising:

an optical system support member to support said vibration correcting optical system;

wherein said coil support member is integrally formed with said optical system support member.

19. An image vibration correcting device according to claim 17, wherein said coil support member includes a terminal for current supply to said coil, and an end of said coil is electrically connected with said terminal, through an interior of said coil support member.

20. An image vibration correcting device according to claim 19, wherein.

said elastic support member supports said vibration correcting optical system movably in a plane perpendicular to an optical axis of an image taking device; and said terminal is integrally formed with said coil support member, and said elastic support member is fixed to said terminal.

21. An image vibration correcting device according to claim 20, wherein said terminal includes a hole to fix said elastic support member, said elastic support member is fixed to said terminal by soldering, and the clearance between an internal diameter of said hole and an external diameter of said elastic support members is so maintained that the solder does not flow to an outside of said elastic support members.

22. An image vibration correcting device according to claim 15, wherein said elastic support member is composed of a conductive material.

23. An image vibration correcting device comprising:

a vibration correcting optical system;

a support frame to support said vibration correcting optical system;

a substrate including a pattern for transmitting an electrical signal; and a support member having first and second ends, the first end being attached to said support frame and the second end being attached to the substrate.

24. An image vibration correcting device as claimed in claim 23, wherein said support member is formed of conductive material and is attached to the substrate by soldering to electrically connect said support member with the pattern.

25. An image vibration correcting device as claimed in claim 23, further comprising:

a position detecting portion to detect a position of said vibration correcting optical system, said position detecting portion including a light emitting device, a slit, and a light sensitive element, wherein one of said light emitting device and said light sensitive element is disposed in an opening in said substrate.

26. An image vibration correcting device as claimed in claim 25, wherein a distance between said light sensitive device and said light emitting device is optimized so as to enable precise correction of image vibration.

* * * * *